(12) United States Patent
Yokoyama

(10) Patent No.: US 8,187,760 B2
(45) Date of Patent: May 29, 2012

(54) FUEL CELL SYSTEM FOR REPRESSING RESERVOIR WATER BACKFLOW

(75) Inventor: Junichi Yokoyama, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 966 days.

(21) Appl. No.: 12/223,648

(22) PCT Filed: Feb. 26, 2007

(86) PCT No.: PCT/JP2007/054119
§ 371 (c)(1),
(2), (4) Date: Aug. 6, 2008

(87) PCT Pub. No.: WO2007/102445
PCT Pub. Date: Sep. 13, 2007

(65) Prior Publication Data
US 2009/0011299 A1    Jan. 8, 2009

(30) Foreign Application Priority Data
Feb. 27, 2006 (JP) .................. 2006-050832

(51) Int. Cl.
*H01M 8/06* (2006.01)
*H01M 2/36* (2006.01)
(52) U.S. Cl. ......... 429/429; 429/450; 429/414; 429/423
(58) Field of Classification Search .............. 429/20, 429/400–535
See application file for complete search history.

(56) References Cited

U.S. PATENT DOCUMENTS
6,183,895 B1 * 2/2001 Kudo et al. .................. 429/410
6,620,537 B2 * 9/2003 Struthers et al. ............. 429/423

FOREIGN PATENT DOCUMENTS
JP    3-219565 A    9/1991
JP    2002-134145 A    5/2002
(Continued)

OTHER PUBLICATIONS
Notification of Reasons for Refusal of Patent Application No. 2006-050832 and partial translation thereof received Aug. 2, 2011.

*Primary Examiner* — Keith Walker
*Assistant Examiner* — Caleb Henry
(74) *Attorney, Agent, or Firm* — Kenyon & Kenyon LLP

(57) ABSTRACT

A fuel-cell system is advantageous for repressing water from flowing backward from a reservoir to a condenser, flowing backward which results from the inside of the condenser being turned into negative pressure. The fuel-cell system has a fuel cell for generating electric power by reactant gas, a condenser for generating condensed water by condensing water content included in the reactant gas to be supplied to the fuel cell or in off gas of the reactant gas, and a reservoir for reserving the condensed water collected at the condenser. A drain valve is disposed between the condenser and the reservoir. The drain valve is switchable between a closed state in which communication between the condenser and the reservoir is shut off and an opened state in which the condenser is communicated with the reservoir to discharge the water in the condenser to the reservoir. A controller carries out inner-pressure increment and drain controls for opening the drain valve after increasing inner pressure in the condenser.

22 Claims, 13 Drawing Sheets

FOREIGN PATENT DOCUMENTS

| | | |
|---|---|---|
| JP | 2002-260699 A | 9/2002 |
| JP | 2002-298896 A | 10/2002 |
| JP | 2003-223921 A | 8/2003 |
| JP | 2003-338304 A | 11/2003 |
| JP | 2004-182531 A | 7/2004 |
| JP | 2004-220876 A | 8/2004 |
| JP | 2005-276523 A | 10/2005 |
| JP | 2007-26892 A | 2/2007 |
| JP | 2007-184136 A | 7/2007 |

* cited by examiner

FUEL CELL SYSTEM FOR REPRESSING RESERVOIR WATER BACKFLOW

This is a 371 national phase application of PCT/JP2007/054119 filed 26 Feb. 2007, claiming priority to Japanese Patent Application No. 2006-050832 filed 27 Feb. 2006, the contents of which are incorporated herein by reference.

FIELD OF THE INVENTION

The present invention relates to a fuel-cell system, which includes a condenser for condensing water content that is contained in gas.

BACKGROUND OF THE INVENTION

As a fuel-cell system, one, which has a fuel cell for generating electric power by fuel gas, a condenser for generating condensed water by condensing water content, which is included in the fuel gas to be supplied to the fuel cell, and a reservoir for reserving the condensed water being collected at the condenser, has been known.

When turning off the operation of the aforementioned fuel-cell system, it is turned off completely after cooling a reformer for reforming fuel gas to a certain extent, and is thereafter stood to cool. Moreover, in the fuel-cell system, when the operation is turned off, for the purpose of the inhibition of mingling foreign materials, the protection of catalyst within the reformer, and the like, the vicinities of the reformer and condenser are turned into an enclosed space by shutting off opening-closing valve, and are not opened to atmosphere. Accordingly, when turning off the operation of the fuel-cell system, the aforementioned enclosed space cools gradually from such a state that it has heat. At this moment, water condenses by the fact that gas, which includes water vapor abundantly, is cooled. Therefore, the inside of the enclosed space turns into negative pressure. In this state, if a drain valve, which is connected to the condenser, is opened in order to discharge water that is collected in the condenser, there is a fear that the water, which is collected in the reservoir, might have flowed backward to the condenser side (negative pressure side) by way of the drain valve because of the influence of the negative pressure.

In Patent Literature No. 1, in fuel-cell system, a technique is disclosed, technique that relates to a start-up method of fuel-cell system in which a heat exchanger is disposed on the downstream sides of reformer, CO transformer and CO remover, respectively; and in which exclusive piping is disposed to the respective heat exchangers. According to this one, it is made so that, before getting the start-up started, inert gas is supplied to the respective heat exchangers; and then condensed water, which resides inside the respective heat exchangers, is discharged out of the respective heat exchangers; and thereafter the fuel-cell system is started up. According to this one, since it is possible to discharge the condensed water, which resides inside the respective heat exchangers, by the inactive gas, it is possible to warm up the respective reformer, CO transformer and CO reducer at an early stage.

Moreover, in Patent Literature No. 2, a fuel-cell system is disclosed, fuel-cell system which has a condenser for condensing water content, which is included in fuel gas; two or more gas-liquid separators for letting condensed water undergo gas-liquid separation; a collected-water reservoir for reserving condensed water, which is subjected to gas-liquid separation at the respective gas-liquid separators; drain passages, which connect between the gas-liquid separators and the collected-water reservoir; and a valve mechanism being disposed in the drain passages. According to this one, a controller controls the valve mechanisms so that the multiple gas-liquid separators do not pass water to each other by way of the drain passages. Thus, it is made so as to prevent the backward flow of water, which results from differential pressures arising mutually between the multiple gas-liquid separators.

Moreover, in Patent Literature No. 3, a fuel-reforming apparatus is disclosed, fuel-reforming apparatus in which are former for reforming fuel gas into hydrogen-rich gas, and a CO reducer for reducing CO, which is included in gas after reforming, are disposed; and further in which a drain hole is formed in the bottom of the reformer, and a drain hole is formed in the bottom of the CO reducer. According to this one, a fuel-reforming apparatus for fuel cell is disclosed, fuel-reforming apparatus that discharges: liquid content, which is collected in the reformer; and liquid content, which is collected in the CO reducer; when starting up the system.

[Patent Literature No. 1] Japanese Unexamined Patent Publication (KOKAI) Gazette No. 2002-260, 699;

[Patent Literature No. 2] Japanese Unexamined Patent Publication (KOKAI) Gazette No. 2004-220, 876; and

[Patent Literature No. 3] Japanese Unexamined Patent Publication (KOKAI) Gazette No. 2004-182, 531

SUMMARY OF THE INVENTION

In the techniques according to the aforementioned respective patent literatures, there is no description on discharging the condensed water in the condenser in such a state that the condenser of the fuel-cell system and the piping, which is connected to the condenser, exhibit negative pressures. Therefore, in such a state that the condenser and the piping being connected to the condenser exhibit negative pressures, when the drain valve is opened, resulting from the negative pressures, the backward flow of water might be highly likely to occur.

The present invention has been done in view of the aforementioned circumstances, and it is an object to provide a fuel-cell system which is advantageous for repressing water from flowing backward from the reservoir to the condenser, flowing backward which results from the negatively pressurized inside of the condenser.

A fuel-cell system according to the present invention comprises: a reformer being heated by a burner, thereby generating reactant gas from fuel; a fuel cell for generating electric power by reactant gas; a condenser for generating condensed water by condensing water content, which is included in the reactant gas to be supplied to the fuel cell or in off gas of the reactant gas; and a reservoir for reserving the condensed water being collected in the condenser, and it further comprises: (i) a drain valve being disposed between the condenser and the reservoir, and being capable of switching between a closed state, in which communication between the condenser and the reservoir is shut off, and an opened state, in which the condenser is communicated with the reservoir to discharge the water in the condenser to the reservoir; and (ii) a controller for carrying out inner-pressure increment and drain controls in which the drain valve is put into the opened state after increasing inner pressure in the condenser upon starting up the fuel-cell system. Moreover, a fuel-cell system of the present invention can comprise: a reformer being heated by a burner, thereby generating reactant gas from fuel; a fuel cell for generating electric power by the reactant gas; a condenser for generating condensed water by condensing water content, which is included in the reactant gas to be supplied to the fuel cell or in off gas of the reactant gas; and a reservoir for reserving the condensed water being collected in the condenser, and it can further comprise: (i) a drain valve being disposed between the condenser and the reservoir, and being capable of switching between a closed state, in which communication between the condenser and the reservoir is shut off, and an opened state, in which the condenser is communicated with the reservoir to discharge the water in the condenser to the reservoir; and (ii) a controller for carrying out inner-pressure increment and drain controls in which inner pressure in the condenser is increased and thereafter the drain valve is put into the opened state upon starting up the fuel-cell system; wherein, in carrying out the inner-pressure increment and drain controls, the controller executes a first manipulation for increasing the inner pressure in the condenser by supplying fuel gas or inactive gas to the condenser; a second manipulation for detecting increment of the inner pressure in the condenser; and a third manipulation for opening the drain valve when increment amount of the inner pressure in the condenser is a first set pressure or more. The reactant gas means gas that contributes to electric-power generation reaction in the fuel cell. In the case where a reformer is disposed, the reactant gas becomes reformed gas that is made by reforming raw-material gas at the reformer.

According to the present invention, when the drain valve is opened, the water, which is collected in the condenser, passes through the drain pipe, and is transferred to the reservoir. When the drain valve is thus opened, the inner pressure in the condenser is increased by a command from the controller. Accordingly, the water in the reservoir is repressed from flowing backward to the condenser.

Effect of Invention

According to the present fuel-cell system, when the drain valve is opened, the inner pressure in the condenser has increased. Accordingly, when the drain valve is opened, the water in the reservoir is repressed from flowing backward to the condenser.

DETAILED DESCRIPTION

Figure 1:
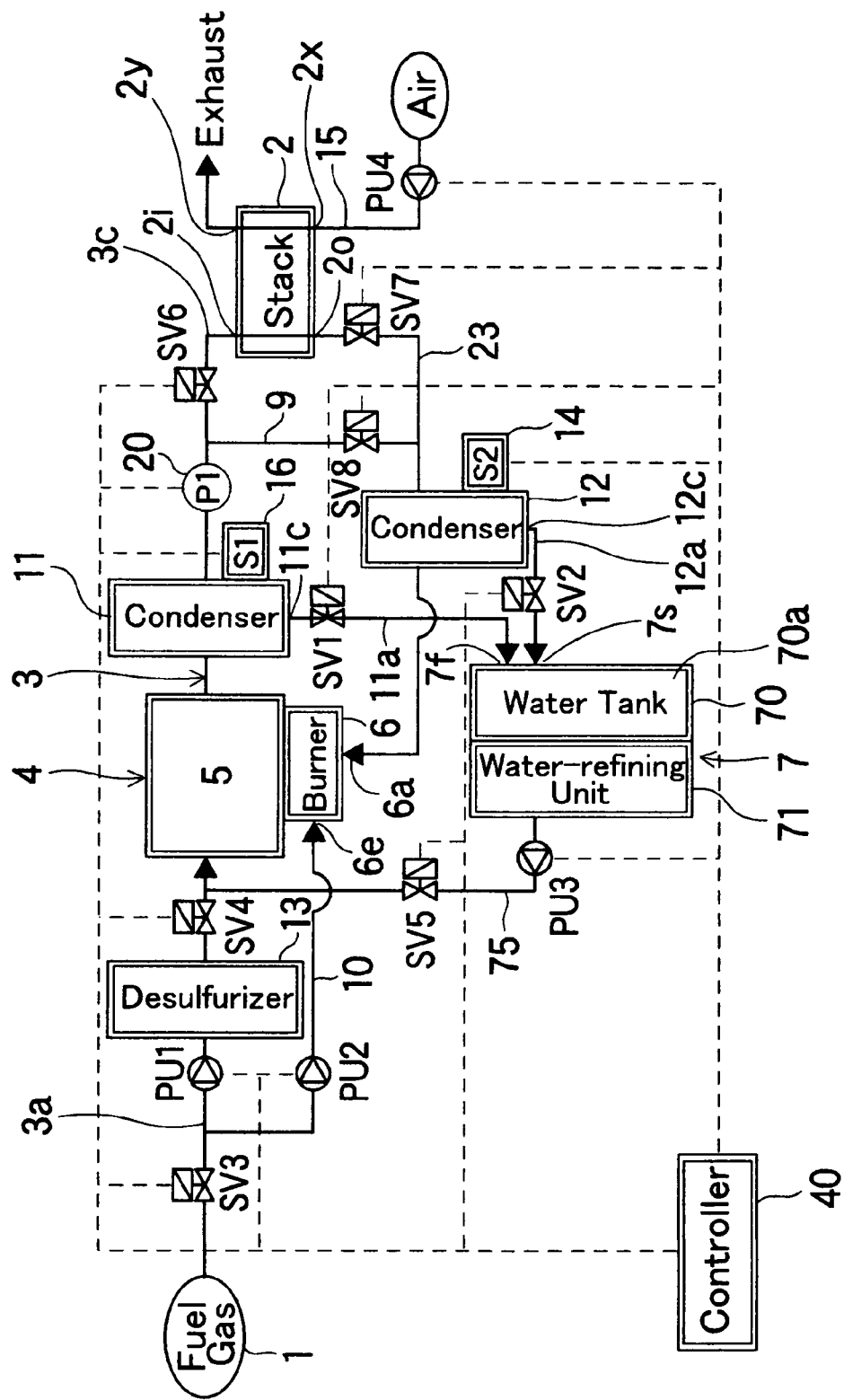
FIG. 1 is directed to Embodiment No. 1, and is a block diagram of a fuel-cell system.

A fuel-cell system according to the present invention has: a fuel cell for generating electric power by reactant gas; a condenser for generating condensed water by condensing water content, which is included in the reactant gas to be supplied to the fuel cell or in off gas of the reactant gas; and a reservoir for reserving the condensed water being collected in the condenser. A drain valve for discharging water being collected in the condenser is disposed. The condenser is for generating condensed water by condensing water content being included in the reactant gas to be supplied to the fuel cell or off gas of the reactant gas, and its structure is not limited in particular. As for the reactant gas for generating the condensed water, it can be fuel gases and/or oxidizing-agent gases. The drain valve is disposed between the condenser and the reservoir. The drain valve is made switchable between a closed state, in which communication between the condenser and the reservoir is shut off, and an opened state, in which the condenser is communicated with the reservoir to discharge the water in the condenser to the reservoir.

A controller carries out inner-pressure increment and drain controls. Namely, the controller carries out inner-pressure increment and drain controls in which the drain valve is switched to the opened state after increasing the inner pressure in the condenser. Accordingly, when the drain valve is opened, the inner pressure in the condenser has increased. Accordingly, the water in the reservoir is repressed from flowing backward to the condenser. Even if it should have occurred that the water in the reservoir has flowed backward to the condenser, the volume of water flowing backward is reduced, compared with the case where the inner pressure in the condenser is not increased.

The controller carries out the aforementioned inner-pressure increment and drain controls upon the start-up of the fuel-cell system. When the operation of the fuel-system is turned off, since the condenser and piping being connected to the condenser are cooled, gases, which reside in the condenser and in the piping being connected to the condenser, are cooled as they keep including water vapor. Accordingly, water condenses so that there also arises a case where it is necessary to drain it. It is made in such a structure that the condensed water is collected in the condenser by gravity. Therefore, the drain valve is opened upon the start-up of the fuel-cell system. At a time like this, since the inner pressure of the condenser is increased by the aforementioned inner-pressure increment and drain controls, the backward flowing from the reservoir to the condenser is prevented.

According to the present invention, a form is exemplified, form in which an opening-closing valve is disposed on an upstream side and downstream side of the condenser, respectively; and form in which inside of the condenser is put into an enclosed space by shutting off the opening-closing valves. Since the inside of the condenser is cooled as it is kept being put into an enclosed space including water vapor, the inside of the condenser is likely to turn into negative pressure by cooling.

According to the present invention, a form is exemplified, form in which inside of the condenser is connected to a reformer; and form in which water content being included in fuel gas to be reformed at the reformer is condensed at the inside of the condenser. The reformer reforms fuel gas before reforming reaction (a raw material for reforming) by reforming reaction, and generates fuel gas for fuel cell (reformed gas). Here, a form, in which the reservoir is connected to the reformer by way of a water-supply passage, is exemplified. In this case, the reservoir supplies water, which is reserved in the reservoir, as raw-material water for reforming reaction in the reformer by way of the water-supply passage.

According to the present invention, as for the controller, a form is exemplified, form in which, in carrying out the inner-pressure increment and drain controls, the controller executes a first manipulation for increasing the inner pressure in the condenser by supplying fuel gas or inactive gas to the condenser; a second manipulation for detecting increment of the inner pressure in the condenser; and a third manipulation for opening the drain valve when increment amount of the inner pressure in the condenser is a first set pressure or more.

Here, a form is exemplified, form in which a first fluid conveyor source (pump, and the like, for instance) is disposed upstream to the condenser; and form in which the controller includes a device for judging whether the inner pressure in the condenser has increased more than a set pressure or not depending on driven time of the first fluid conveyor source is disposed. Moreover, a form is exemplified, form in which a flow-volume sensor is disposed upstream to the condenser; and form in which the controller includes a device for judging whether the inner pressure in the condenser has increased more than a set pressure or not depending on input flow volume being detected by the flow-volume sensor. Moreover, as for the controller, a form is exemplified, form which includes a device for judging gas-leakage existence or non-existence in the condenser and in the piping, being connected to the condenser, by detecting the decrement of increased inner pressure in the condenser, or detecting the fact that the inside pressure does not increase, by utilizing inner-pressure increment in the condenser and in the piping being connected to the condenser, when executing the aforementioned inner-pressure increment and drain controls. In this case, the gas-leakage existence or nonexistence is detected every time the inner-pressure increment and drain controls are executed. Accordingly, it is possible to enhance reliability of the system more.

According to the present invention, as for the gas for increasing the inner pressure in the condenser, it can even be fuel gas before reforming (natural gases or city gases, and the like, for instance), or can even be fuel gas after reforming, or can even be inert gas. The inert gas is such that nitrogen gas and argon gas are exemplified. As for the controller, a form is exemplified, form which carries out an abnormal judgment (leakage in piping, and the like, for instance) when decrement amount of the inner pressure in the condenser ($\Delta P$) surpasses a second set pressure ($\Delta PE$).

According to the present invention, the controller can be, for instance, such a form that does not carry out the inner-pressure increment and drain controls when the inside of the condenser is judged not to be negative pressure. Especially, a form is exemplified, form which ignites a reformer's burner without carrying out the inner-pressure increment and drain controls. When the inside of the condenser is judged not to be negative pressure, since it is assumed that the backward flowing of water does not occur, the controller does not carry out the inner-pressure increment and drain controls. In this case, since it is possible to abbreviate the inner-pressure increment and drain controls, it is possible to shorten the start-uptime of the present system. As for the judgment whether the inside of the condenser is negative pressure or not, it is possible to carry it out using a pressure sensor, which detects pressure of space in the condenser or space that is connected to the condenser. Alternatively, it is possible to carry it out using a temperature sensor, which detects temperature of space in the condenser or space that is connected to the condenser. When the temperature of this space is a predetermined temperature or more, since negative pressurization resulting from cooling does not occur, it is possible to abbreviate the inner-pressure increment and drain controls, but it is allowable to execute the inner-pressure increment and drain controls, if necessary.

Hereinafter, embodiments will be explained concretely.

[Embodiment No. 1]

Hereinafter, Embodiment No. 1 will be explained with reference to FIG. 1-FIG. 3. In FIG. 1, piping is specified with continuous lines, and signal lines, which are connected to a controller 40, are specified with dashed lines. According to a fuel-cell system of the present embodiment, a fuel-supply passage 3, which comes from a fuel-gas supply source 1 and which is connected to a fuel inlet 2$i$ of a stack 2, is disposed. The stack 2 is formed by laminating fuel-cell cells. The fuel-supply passage 3 is equipped with passages 3$a$, 3$c$.

As illustrated in FIG. 1, in the fuel-supply passage 3, a reformer 4, a first condenser 11 and a stack 2 are arranged in series in this order from the upstream side as major constituent elements. Therefore, in the fuel-supply passage 3, the first condenser 11 is arranged downstream to the reformer 4. The stack 2 is assembled fuel cells for generating electric power by fuel gas (reactant gas) and oxidizing-agent gas (reactant gas), which function as fuel. The stack 2 has fuel electrodes, to which the fuel gas is supplied, oxidizing-agent electrodes, to which the oxidizing-agent gas (air in general) is supplied, and electrolytic membranes, which are arranged between the fuel electrodes and the oxidizing-agent electrodes. The electrolytic membranes are formed of solid polymer membrane (fluorocarbon system or hydrocarbon system, for instance). The oxidizing-agent gas is supplied to the oxidizing-agent electrodes through an oxidizing-agent inlet 2$x$ of the stack 2 via an oxidizing-agent-gas passage 15 and a fourth pump PU4, passes the inside of the stack 2 to be used for electric-power generation reaction, and is discharged through an oxidizing-agent outlet 2$y$ of the stack 2.

According to the present embodiment, the first condenser 11 generates condensed water by condensing water content, which is included in the fuel gas as reactant gas that is supplied to the fuel inlet 2$i$ of the stack 2. Although the first condenser 11 includes a cooling unit, in which coolant such as cooling water flows; and is constructed so as to condense water content by the cooling unit, it is not limited to this. A first water-level sensor 16, which detects water volume that is collected in the first condenser 11, is annexed to the first condenser 11.

In the fuel-supply passage 3, the reformer 4 is disposed upstream to an inlet of the first condenser 11. The reformer 4 reforms before-reforming fuel gas (raw-material gas, such as natural gases and city gases, for instance), which is supplied from the fuel-gas supply source 1, to hydrogen-rich gas by reforming reaction (reforming reaction utilizing water vapor). The reformer 4 is equipped with a reforming-reaction unit 5, which reforms the fuel gas to reformed gas by reforming reaction (reforming reaction utilizing water vapor), and a burner 6, which heats the reforming-reaction unit 5. Hence, in the reformer 4, when combustion occurs at the burner 6, the reforming-reaction unit 5 is heated to high temperatures. At this moment, when the fuel gas and raw-material water are supplied to the reforming-reaction unit 5, the fuel gas is reformed to turn into hydrogen-containing gas by water vapor and heat of the reforming-reaction unit 5. Such a reforming reaction is carried out in the reforming-reaction unit 5. Therefore, the fuel gas (reactant gas), which has undergone the reforming reaction, includes water vapor abundantly. The fuel gas, which has undergone the reforming reaction in the reforming-reaction unit 5, is supplied to the fuel electrodes of the stack 2 through a fuel inlet 2$i$ of the stack 2 via the first condenser 11 and a sixth opening-closing valve SV6. Here, the water vapor, which is included in the after-reforming-reaction fuel gas, is condensed by the first condenser 11, which has cooling function, to turn into condensed water. Therefore, humidity of the fuel gas, which is supplied to the fuel electrodes of the stack 2, is made adequate.

As illustrated in FIG. 1, of the fuel-supply passage 3, in a passage 3$a$ that connects between the upstream side of the reformer 4's inlet and the fuel-gas supply source 1, a third opening-closing valve SV3, a first pump PU1, a desulfurizer 13 and a fourth opening-closing valve SV4 are arranged in series in this order. Therefore, the third opening-closing valve SV3, the desulfurizer 13 and the fourth opening-closing valve SV4 are disposed upstream to the reforming-reaction unit 5 in the passage 3$a$ of the fuel-cell passage 3. A branched passage 10, which branches from the passage 3$a$ of the fuel-supply passage 3, is disposed. The fuel-gas supply source 1 is connected to an inlet 6$e$ of the reformer 4's burner 6 by way of the branched passage 10. In the branched passage 10, a second pump PU2 is disposed. When the second pump PU2 is driven, the fuel gas in the fuel-gas supply source 1 is supplied to the burner 6 through the inlet 6$e$, and is combusted at the burner 6. The burner 6 takes in outside air for combustion by a not-shown air-supplying apparatus.

As illustrated in FIG. 1, a first drain passage 11$a$, which connects between the first condenser 11's bottom and the reservoir 7, is disposed. An openable-closable first drain valve SV1 is disposed in the first drain passage 11$a$. Therefore, the first drain valve SV1 is disposed between the first condenser 11's drain hole 11$c$ and the reservoir 7's first inlet 7$f$. The first drain valve SV1 is for discharging water being collected in the bottom of the first condenser 11. Since the drain valve 1 discharges water in the first condenser 11 through the first drain passage 11$a$ utilizing gravity, it is disposed below the first condenser 11. The first drain valve SV1 is made switchable between a closed state, in which the communication between the first condenser 11's drain opening 11$c$ and the reservoir 7's first inlet 7$f$ is shut off; and an opened state, in which the first condenser 11's drain opening 11$c$ is communicated with the reservoir 7's first inlet 7$f$ to discharge water in the first condenser 11 to the reservoir 7's first inlet 7$f$.

As illustrated in FIG. 1, the reservoir 7 reserves condensed water being collected at the first condenser 11. Here, the reservoir 7 has a water-reserving unit 70 having a reservoir chamber 70$a$ for reserving water, and a water-refining unit 71 for refining water being reserved in the water-reserving unit 70. The reservoir chamber 70 is communicated with the atmosphere. The water-reserving unit 70 is arranged on a side that is nearer to the first condenser 11 than the water-refining unit 71 is. The water-refining unit 71 is arranged on a side that is more distant with respect to the first condenser 11 than the water-reserving unit 70 is. The condensed water, which is collected in the bottom of the first condenser 11, is supplied to the reservoir 7's first inlet 7$f$ by way of the first drain passage 11$a$ and first drain valve SV1 by opening the first drain valve SV1, and arrives at the water-refining unit 71 by way of the water-reserving unit 70. The water-refining unit 71 includes a purifying element such as ion-exchange membrane for turning water into pure water. Even when the purity of water in the reservoir 7 is not sufficient, such water is purified by the water-refining unit 71 to turn into pure water. This is for reutilizing the water at the reforming reaction in the reforming-reaction unit 5.

As illustrated in FIG. 1, an outlet of the reservoir 7's water-refining unit 71 is connected to an inlet of the reformer 4 by way of a water-feed passage 75. In the water-feed passage 75, a third pump PU3 and a fifth opening-closing valve SV5 are disposed. Therefore, the water, which has been turned into pure water by the water-refining unit 71, is supplied as raw-material water to the reformer 4's reforming-reaction unit 5 by way of the water-feed passage 75, and is used for the reforming reaction.

In the fuel-supply passage 3, a passage 3$c$, which connects the first condenser 11's outlet and the fuel-cell stack 2's fuel inlet 2$i$, is disposed. In the passage 3$c$, a pressure sensor 20 and a sixth opening-closing valve SV6 are disposed in series in this order. The pressure sensor 20 is positioned downstream to the first condenser 11. A fuel off-gas outlet 2$o$ of the stack 2 is connected to an off-gas inlet 6$a$ of the reformer 4's burner 6 by way of a return passage 23. In the return passage 23, from the upstream side to this, a seventh opening-closing valve SV7 and a second condenser 12 are arranged in series in this order. In fuel off gas being discharged through the fuel off-gas outlet 2$o$ of the stack 2, fuel components might reside. The second condenser 12 is for removing water content, which is discharged through the fuel off-gas outlet 2$o$ of the stack 2 by condensation. The fuel off gas, which is discharged through the fuel off-gas outlet 2$o$ of the stack 2, arrives at the off-gas inlet 6$a$ of the burner 6 by opening the seventh opening-closing valve SV7, and is burned at the burner 6. In this case, since the fuel off gas passes the second condenser 12, water content, which is included in the fuel off gas, condenses to be removed. Accordingly, the fuel off gas is burned satisfactorily at the burner 6. The fuel off gas means gas after the fuel gas has undergone the electric-power generation reaction.

As illustrated in FIG. 1, the second condenser 12 has a second water-level sensor 14 for detecting water level in this. When the second water-level sensor 14 detects a predetermined volume of condensed water being collected in the second condenser 12, a second drain valve SV2 opens. Thus, the condensed water, which is collected in the second condenser 12, is supplied to the reservoir 7's second inlet 7$s$ by way of a second drain passage 12$a$. The second drain valve SV2 is made switchable between a closed state, in which the communication between the second condenser 12's drain opening 12$c$ and the reservoir 7's second inlet 7 is shut off; and an opened state, in which the second condenser 12's drain opening 12$c$ is communicated with the reservoir 7's second inlet 7$s$ by way of the second drain passage 12$a$ to discharge water in the second condenser 12 to the reservoir 7. The second drain passage 12$a$ communicates the water reservoir 7's second inlet 7$s$ with the second condenser 12's drain port 12$c$.

The reservoir 7 is arranged below the first condenser 11 and second condenser 12 in the direction of gravitational force. In the direction of gravitational force, the first drain valve SV1 and second drain valve SV2 are arranged below the first condenser 11 and second condenser 12 and more above than the reservoir 7 is. This is because the reservoir 7 receives water, which is collected in the first condenser 11 and second condenser 12, with gravity.

As illustrated in FIG. 1, a bypass passage 9 is disposed in the fuel-supply passage 3. The bypass passage 9 communicates the fuel-supply passage 3 with the return passage 23, and bypasses the fuel gas, which is reformed at the initial start-up stage of the present system, so as not to be supplied to the stack 2. In the bypass passage 9, an eighth opening-closing valve SV8 for opening and closing the bypass passage 9 is disposed. In the initial start-up stage of the reformer 4, the composition of reformed gas might not be stabilized sufficiently. Accordingly, in such a state that the sixth opening-closing valve SV6 (valve SV6 being disposed upstream to the stack 2 in the fuel-supply passage 3, and opening and closing the fuel inlet 2i of the stack 2) and seventh opening-closing valve SV7 (valve SV7 being disposed in the return passage 23, and opening and closing the fuel off-gas outlet 2o of the stack 2) are closed, the eighth opening-closing valve SV8 of the bypass passage 9 opens. Accordingly, in the initial start-up stage of the reformer 4, the reformed gas does not flow to the stack 2, but flows through the bypass passage 9; arrives at the burner 6 via the bypass passage 9 and second condenser 12; is burned at the burner 6; and is utilized for heating the reforming-reaction unit 5.

As illustrated in FIG. 1, a controller for controlling the present system is disposed. The controller 40 controls the first drain valve SV1, the second drain valve SV2, the third opening-closing valve SV3, the fourth opening-closing valve SV4, the fifth opening-closing valve SV5, the sixth opening-closing valve SV6, the seventh opening-closing valve SV7, the eighth opening-closing valve SV8, the first pump PU1, the second pump PU2, the third pump PU3, and the fourth pump PU4, respectively. Signals of the pressure sensor 20 are input into the controller 40.

And now, a general basic procedure for starting up the operation of the fuel-cell system will be explained. First of all, the controller 40 opens the third opening-closing valve SV3, and additionally drives the second pump PU2. Thus, the fuel gas is fed to the burner 6, the burner 6 is ignited, and the reforming-reaction unit 5 is heated to high temperature. In this case, since the fourth opening-closing valve SV4 is closed, the fuel gas is not supplied to the reforming-reaction unit 5. In this case, the fifth opening-closing valve SV5, sixth opening-closing valve SV6, seventh opening-closing valve SV7 and eighth opening-closing valve SV8 are further closed. And, the first drain valve SV1 and second drain valve SV2 are closed.

When the burner 6 is ignited, the reforming-reaction unit 5 is heated to become high temperature gradually, and the reforming reaction is started. In carrying out the reforming reaction, the first pump PU1 is driven in such a state that the third opening-closing valve SV3 and fourth opening-closing valve SV4 are opened. Then, the fuel gas in the fuel-gas supply source 1 (before-reforming raw-material gas) is supplied to the reforming-reaction unit 5 via the desulfurizer 13. At this moment, the fifth opening-closing valve SV5 is opened, and additionally the third pump PU3 is driven. Hence, the water in the water-refining unit 71 is supplied to the reforming-reaction unit 5 through the water-feed passage 75. Thus, the fuel gas is water-vapor reformed in the reforming-reaction unit 5, and turns into gas in which hydrogen makes the major component. The thus reformed fuel gas (after-reforming fuel gas, reactant gas) arrives at the second condenser 12 via the bypass passage 9 after the water content is removed at the first condenser 11; is supplied to the burner 6 after the water content is removed at the second condenser 12; and is burned at the burner 6. In this case, the sixth opening-closing valve SV6 on the inlet side of the stack 2, and the seventh opening-closing valve SV7 on the outlet side of the stack 2 are closed, and thereby the fuel gas (reactant gas) is not supplied to the stack 2. This is because the stability of the fuel gas's composition at the initial start-up stage is not necessarily sufficient.

When the fuel gas's composition stabilizes, the eighth opening-closing valve SV8 is closed, and the bypass passage 9 is shut off. Further, the sixth opening-closing valve SV6, and the seventh opening-closing valve SV7 are opened. The fuel gas, which is after being reformed at the reforming-reaction unit 5, turns into reactant gas that can react at the stack 2, and is supplied to the fuel electrodes of the stack 2 through the fuel inlet 2i of the stack 2 via the first condenser 11 and sixth opening-closing valve SV6 to be used for electric-power generation. The after-electric-power-generation-reaction fuel off gas, which is discharged from the stack 2, is supplied to the second condenser 12 via the seventh opening-closing valve SV7 and return passage 23; and is supplied to the burner 6 to be burned thereat after the water content is removed at the second condenser 12.

Next, the case where the operation of the fuel-cell system is turned off will be explained. In this case, the third opening-closing valve SV3, the fourth opening-closing valve SV4, the fifth opening-closing valve SV5, the sixth opening-closing valve SV6, the seventh opening-closing valve SV7, and the eighth opening-closing valve SV8 are closed by the controller 40. Accordingly, the space in the reforming-reaction unit 5, the space in the first condenser 11 that is disposed more downstream than the reforming-reaction unit 5 is, and the space in the piping that is connected to these form an enclosed space about the first condenser 11. That is, an enclosed space is formed in such a state being closed by the fourth opening-closing valve SV4, fifth opening-closing valve SV5, sixth opening-closing valve SV6, eighth opening-closing valve SV8 and first drain valve SV1.

Since the reforming-reaction unit 5 is cooled gradually after turning off the operation of the fuel-cell system, this enclosed space is cooled gradually. At this moment, within the enclosed space, the high-temperature fuel gas including water vapor is sealed. Therefore, the high-temperature fuel gas, which includes water vapor, is cooled while being kept to be enclosed within the enclosed space. By such cooling, the water vapor within the enclosed space condenses gradually in the inside of the enclosed space, and thereby condensed water is generated. The generated condensed water is accumulated in the bottom of the first condenser 11 by gravity. The first condenser 11 is thus set up. In this case, resulting from the decrement of the enclosed space's temperature, and resulting from the gas volumetric decrement when the water vapor within the enclosed space condenses, the inside of the enclosed space (the reforming-reaction unit 5, the inside of the first condenser 11, and the piping for these) turns into negative pressure.

When the operation of the fuel-cell system is thus turned off, the inside of the reforming-reaction unit 5 and the inside of the first condenser 11 turn into negative pressure. In such a state that negative pressure is generated in the inside of the reforming-reaction unit 5 and the inside of the first condenser 11, the negative pressure is prevented by introducing outside air into the inside of the first condenser 11. However, in the case of introducing outside air into the first condenser 11, there is such a fear that catalytic component, which is loaded in the reforming-reaction unit 5 that communicates with the first condenser 11, might be deteriorated by air. Thus, according to the present embodiment, since outside air is not introduced into the inside of the reforming-reaction unit 5 and into the inside of the first condenser 11 upon turning off the system, making the catalytic component in the reforming-reaction unit 5 controller 500 long-lasting is intended.

Note that, after turning off the operation of the fuel-cell system, although the condensed water, which is condensed in the inside of the piping, is accumulated also in the second condenser 12 similarly, the second condenser 12 does not turn into negative pressure because it is put in atmospheric-air communication state because it communicates with the burner 6 that is connected to outside air.

As aforementioned, it is preferable to sufficiently drain the water, which has been collected in the first condenser 11 and second condenser 12, until the time that the fuel-cell system is started up for the next round of operation. Note that, since the second condenser 12 does not turn into negative pressure as described above, it is possible to drain the water in the second condenser 12 by opening the second drain valve SV2 even during the time that the present system is turned off, or even immediately before starting up the present system.

However, regarding the reforming-reaction unit 5 and first condenser 11, since the enclosability of the enclosed space is high as described above, they are maintained to be kept in the negative-pressure state until the time that the fuel-cell system is started up for the next round of operation. Accordingly, upon the start-up of the present system, the first drain valve SV1 is opened in order to discharge the water being collected in the first condenser 11, there is such a fear that the water being collected in the reservoir 7 might be flowed backward to the inside of the first condenser 11 by way of the first drain valve SV1 and first drain passage 11a by the influence of the negative pressure in the enclosed space. When the water in the reservoir 7 thus flows backward to the first condenser 11, there is such a fear that the passage cross-sectional area of the various pipes being connected to the first condenser 11 might be narrowed down, or that the reforming performance of the reformer 4 being connected to the first condenser 11 might be degraded. Especially, since the water in the water-reserving unit 70 is before being reformed at the water-refining unit 71, the purification is not necessarily sufficient. Accordingly, the aforementioned backward flowing is not preferable.

Because of this, according to the present embodiment, the controller 40, first of all, opens the third opening-closing valve SV3 and fourth opening-closing valve SV4, which are arranged more upstream than both of the reformer 40 and first condenser 11 are, before starting-up the operation of the present system. At this moment, the first drain valve SV1 is closed. The fifth opening-closing valve SV5, the sixth opening-closing valve SV6, the seventh opening-closing valve SV7, and the eighth opening-closing valve SV8 are also closed. As a result, the fuel gas from the fuel-gas supply source 1 (before-reforming-reaction fuel gas) is supplied to the spaces, such as the reforming-reaction unit 5 and first condenser 11, which have been turned into negative-pressure state. Accordingly, the reforming-reaction unit 5 and first condenser 11 (enclosed spaces) are pressurized to such high-pressure that surpasses the atmospheric pressure (first manipulation). This is because the pressure of the fuel gas from the fuel-gas supply source 1 (before-reforming-reaction fuel gas) surpasses the atmospheric pressure. An increased inner pressure P1 in the first condenser 11 is detected at the pressure sensor 20 (second manipulation). When the inner pressure P1 in the first condenser 11 becomes a set pressure PA (first set pressure) or more, the first drain valve SV1 is opened (third manipulation).

As aforementioned, when the inner pressure P1 in the first condenser 11 increases by the fuel gas (before-reforming-reaction raw-material gas) that is supplied from the fuel-gas supply source 1; and the inner pressure P1 becomes the set pressure PA or more, the manipulation for opening the first drain valve SV1 is carried out. This is the "inner-pressure increment and drain controls." As a result, the condensed water (condensed water within the first condenser 11), which has been collected in the first condenser 11 while the operation of the fuel-cell system is turned off, moves from the first condenser 11 to the reservoir 7 by way of the first drain passage 11a and first drain valve SV1. Note that the set pressure PA can be set properly in accordance with the present system.

The fact that the water level in the first condenser 11 has dropped is detected by the first water-level sensor 16. Then, in such a state that the sixth opening-closing valve SV6, seventh opening-closing valve SV7 and eighth opening-closing valve SV8 are closed, the first drain valve SV1 and fourth opening-closing valve SV4 close. Further, the controller 40 turns off the first pump PU1, thereby turning off the fuel-gas supply to the reformer 4 and first condenser 11.

After thus discharging the condensed water, which has been collected in the first condenser 11, to the reservoir 7 by way of the first drain passage 11a, the controller 40 ignites the burner 6 by starting the start-up of the present system. That is, in such a state that the third opening-closing valve SV3 opens, the controller 40 drives the second pump PU2 to supply the fuel gas to the burner 6 and ignite the burner 6, thereby heating the reforming-reaction unit 5 to high-temperature region that is appropriate for the reforming reaction. After the reforming-reaction unit 5 reaches the high-temperature region, while maintaining the burning in the burner 6, the fourth opening-closing valve SV4 is opened, and additionally the first pump PU1 is driven to supply the fuel gas to there forming-reaction units, and thereby the fuel gas is reformed to generate fuel gas. At this moment, as described above, in such a state that the fifth opening-closing valve SV5 has opened, the third pump PU3 is driven, and thereby the raw-material water is supplied from the water-refining unit 71 of the reservoir 7 to the reforming-reaction unit 5.

In the initial stage of the start-up of the present system, the composition of the fuel gas, which is reformed at the reforming-reaction unit 5, might not stabilize. Accordingly, the controller 40 opens the eighth opening-closing valve SV8 in such a state that it closes the sixth opening closing valve SV6 and seventh opening-closing valve SV7, thereby sending the fuel gas of the start-up initial stage to the burner 6 through the bypass passage 9 via the second condenser 12. When the composition of the fuel gas, which is reformed at the reforming-reaction unit 5, has stabilized, the controller 40 opens the sixth opening-closing valve SV6 and seventh opening-closing valve SV7 in such a state that it closes the eighth opening-closing valve SV8, thereby supplying the fuel gas to the fuel inlet 2i of the stack 2. Thus, the electric-power generation operation is carried out at the stack 2 along with the oxidizing-agent gas that is supplied through the oxidizing-agent-gas passage 15.

Note that, although the first water-level sensor 16 for detecting the water level in the first condenser 11 is disposed, it is allowable to abolish the first water-level sensor 16 if the continuous time, during which the first opening-closing valve SV1 opens, has been known already. In this case, it is allowable to estimate the drain volume from the first drain valve SV1 by setting an open time during which the first drain valve SV1 opens in advance and opening the first drain valve SV1 for that time, and then to execute the inner-pressure increment and drain controls. The first pump PU1—the fourth pump PU4 can be those which function as a fluidic conveyor source, respectively, and can be adapted into a fluidic conveyor source other than pump. Therefore, the first pump PU1 corresponds to a first fluidic conveyor source; the second pump PU2 corresponds to a second fluidic conveyor source; the third pump PU3 corresponds to a third fluidic conveyor source; and the fourth pump PU4 corresponds to a fourth fluidic conveyor source.

(Flow Chart that Controller 40 Executes)

Figure 2:
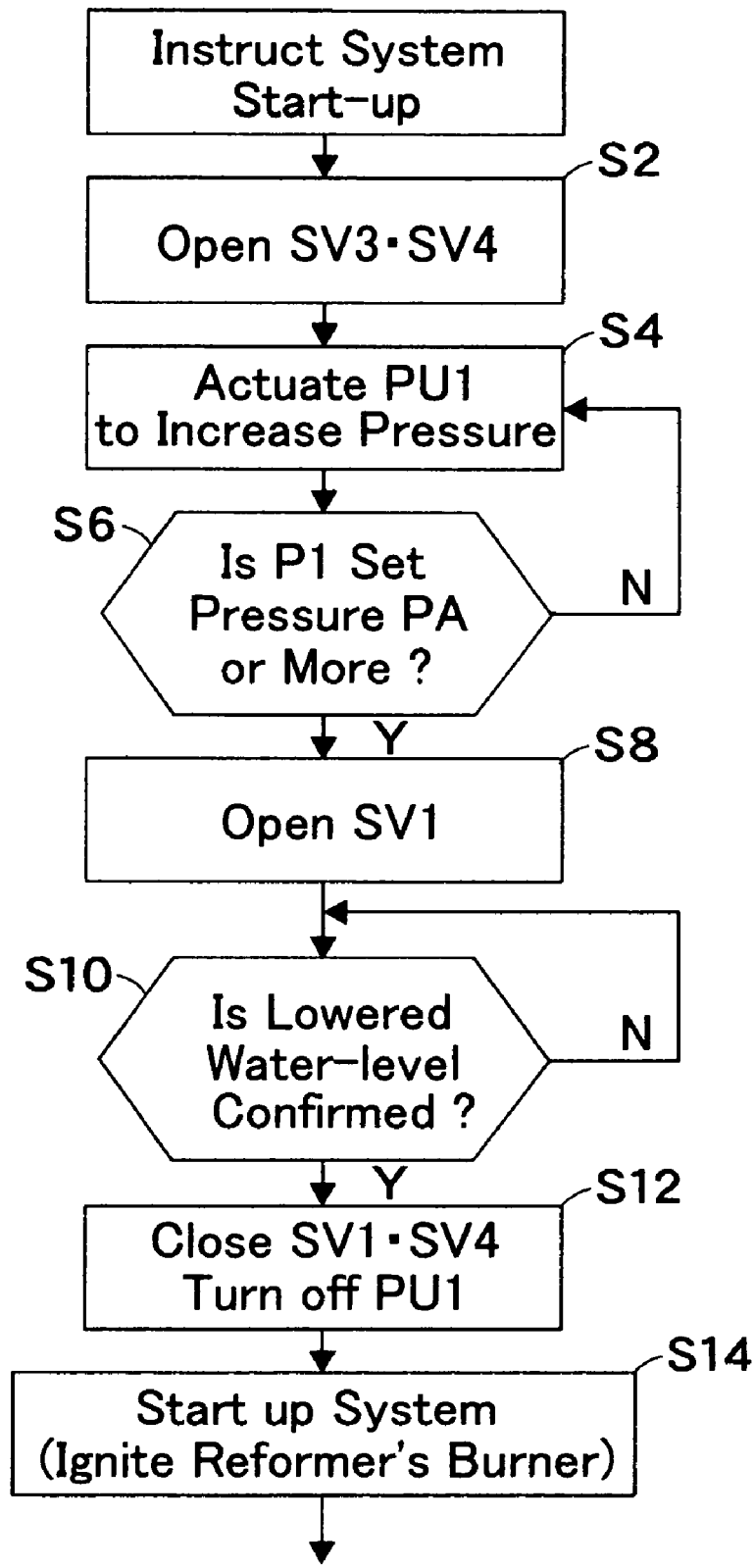
FIG. 2 is directed to Embodiment No. 1, and is a flow chart, which is directed to an example that a controller executes.

FIG. 2 illustrates an example of a flow chart on the inner-pressure increment and drain controls to be executed before igniting the burner 6, inner-pressure increment and drain controls which the controller 40 executes upon starting the start-up of the fuel-cell system. "Y" means "YES." "N" means "NO." The flowchart is not limited to this one. As illustrated in FIG. 2, the controller 40 opens the third opening-closing valve SV3 and fourth opening-closing valve SV4 (Step S2). Further, the controller 40 drives the first pump PU1 (Step S4). At this moment, the first drain valve SV1 is closed. The fifth opening-closing valve SV5, sixth opening-closing valve SV6, eighth opening-closing valve SV7, and seventh opening-closing valve SV8 are also closed. By driving the first pump PU1, the fuel gas is supplied from the fuel-gas supply source 1 to the first condenser 11 via the reformer 4. Hence, the inner pressure P1 in the first condenser 11 increases to surpass the atmospheric pressure. The controller 40 judges whether the inner pressure P1 is the set pressure PA (first set pressure) or more (Step S6). When the inner pressure P1 is the set pressure PA or more ("YES" at Step S6), since there is hardly any fear of flowing backward, the controller 40 opens the first drain valve SV1 (Step S8). By opening the first drain valve SV1, the water level in the first condenser 11 lowers. The controller 40 judges whether the first water-level sensor 16 confirms the fact or not that the water level in the first condenser 11 lowers by a predetermined amount or more (Step S10). Step S6 functions as judging means for judging whether the inner pressure P1 in the first condenser 11 is the set pressure PA or more or not. Step S10 functions as judging means for judging the fact that the water level in the first condenser 11 has lowered by a predetermined amount.

When the water level in the first condenser 11 has lowered by a predetermined amount ("YES" at Step S10), the controller 40 closes the first drain valve SV1 and fourth opening-closing valve SV4, and additionally turns off the first pump PU1 (Step S12). Thereafter, the controller 40 shifts to the start-up control for the fuel-cell system (Step S14), and ignites the burner 6 of the reformer 4. Upon the ignition, the controller 40 drives the second pump PU2 while opening the third opening-closing valve SV3 as described above.

Figure 3:
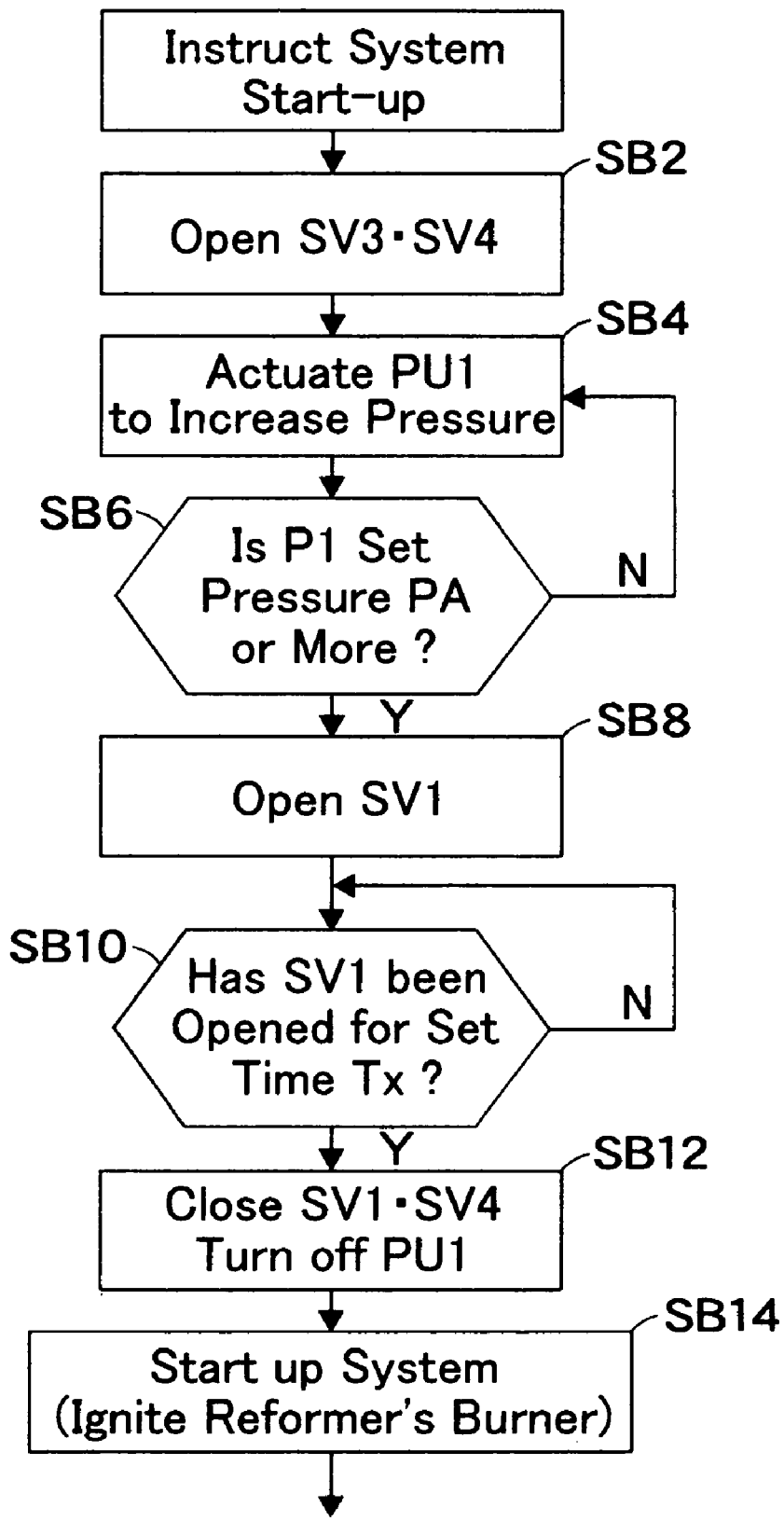
FIG. 3 is directed to Embodiment No. 1, and is a flow chart, which is directed to another example that the controller executes.

FIG. 3 illustrates another example of a flow chart on the inner-pressure increment and drain controls to be executed upon starting the start-up of the fuel-cell system, inner-pressure increment and drain controls which the controller 40 executes. The flow chart shown in FIG. 3 approximates to the flow chart shown in FIG. 2 basically. That is, the third opening-closing valve SV3 and fourth opening-closing valve SV4 are opened (Step SB2). Further, the first pump PU1 is driven (Step SB4). Thus, the fuel gas is supplied from the fuel-gas supply source 1 to the first condenser 11 via the reformer 4, and thereby the inner pressure P1 in the first condenser 11 increases. The controller 40 judges whether the inner pressure P1 in the first condenser 11 is the set pressure PA or more (Step SB6). When the inner pressure P1 in the first condenser 11 is the set pressure PA or more ("YES" at Step SB6), since there is no fear of flowing backward, the controller 40 opens the first drain valve SV1 (Step SB8). By opening the first drain valve SV1, the water level in the first condenser 11 lowers. And so, in order to judge whether the water level in the first condenser 11 has lowered by a predetermined amount or more, the controller 40 judges whether the opening time of the first drain valve SV1 has continued for a set time Tx (Step SB10).

When it continues for the set time Tx ("YES" at Step SB10), it is possible to regard the water level in the first condenser 11 as having lowered. And so, the controller 40 closes the first drain valve SV1 and fourth opening-closing valve SV4, and additionally turns off the first pump PU1 (Step SB12). Thereafter, the controller 40 shifts to the start-up control for the fuel-cell system (Step SB14), and ignites the burner 6 of the reformer 4. According to this flow chart, since the water-level drop is determined based on the opening time of the first drain valve SV1, it is possible to abolish the first water-level sensor 16. Therefore, Step SB10 can function as judging means for judging the water-level lowering in the first condenser 11 by a predetermined amount or more.

As having been explained above, according to the present embodiment, when the fuel-cell system starts up, the controller 40, upon starting the start up, carries out the inner-pressure increment and drain controls in which it supplies the fuel gas (that is, the before-reforming-reaction raw-material gas that is supplied from the fuel-gas supply source 1) from the fuel-gas supply source 1 to the first condenser 11 via the reformer 4; and thereby increases the inner pressure P1 in the first condenser 11. And, when the inner pressure P1 in the first condenser 11 has increased; and when there is hardly any fear of the backward flowing from the reservoir 7 to the first condenser 11, the controller 40 opens the first drain valve SV1, and transfers the water, which is collected in the first condenser 11, to the reservoir 7 by way of the first drain valve SV1 and first drain passage 11a. Thus, according to the present embodiment, prior to that the first drain valve SV1 opens, since the inner pressure P1 in the first condenser 11 has increased, there is hardly any fear of the backward flowing from the reservoir 7 to the first condenser 11. Accordingly, when the fuel-cell system starts up, it is avoided that the water, which is collected in the reservoir 7, flows backward to the first condenser 11.

Especially, according to the present embodiment, upon the start-up of the fuel-cell system, the controller 40, prior to the ignition of the burner 6 of the reformer 4, carries out the inner-pressure increment and drain controls. Accordingly, upon the start-up, it is avoided that the water, which is collected in the reservoir 7, flows backward to the first condenser 11.

Further, according to the present embodiment, in carrying out the inner-pressure increment and drain controls, it heightens the aforementioned inner pressure P1 by supplying the fuel gas (that is, the before-reforming-reaction fuel gas that is supplied from the fuel-gas supply source 1) from the fuel-gas supply source 1 to the first condenser 11 via the reformer 4. Accordingly, compared with the case where the aforementioned inner pressure P1 is heightened by supplying air to the first condenser 11, the deterioration of catalyst, or the like, which is loaded in the reforming-reaction unit 5, is inhibited.

[Embodiment No. 2]

Figure 4:
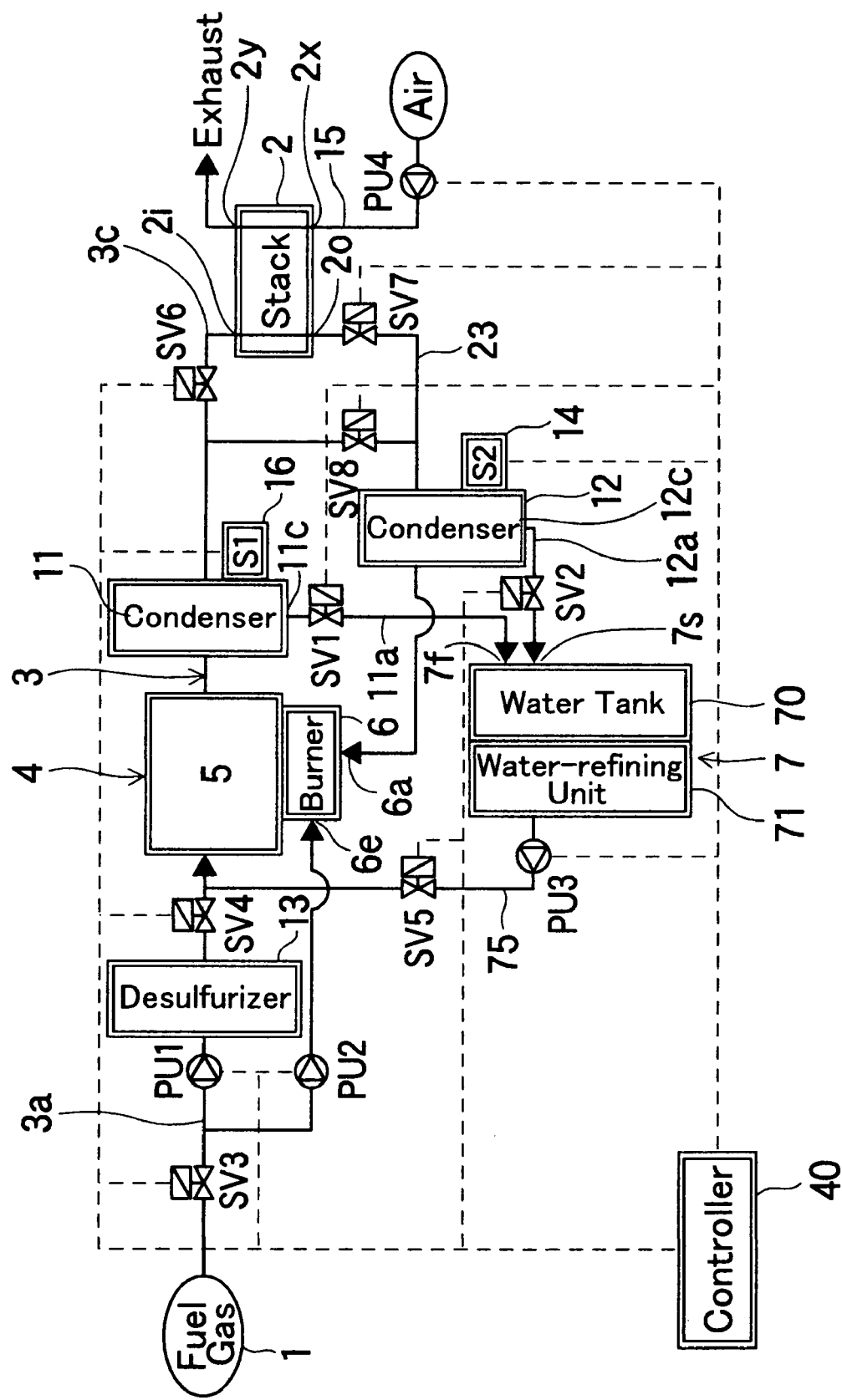
FIG. 4 is directed to Embodiment No. 2, and is a block diagram of a fuel-cell system.

Hereinafter, Embodiment No. 2 according to the present invention will be explained with reference to FIG. 4-FIG. 6. The present embodiment includes the same constructions and operations and/or effects as those of Embodiment No. 1 basically. Hereinafter, it will be explained with a central focus on parts that are different from those of Embodiment No. 1. Since FIG. 4 is the same constructions as those of FIG. 1 basically, the explanation will be omitted.

The case where the operation of the fuel-cell system is turned off will be explained. In this case, the third opening-closing valve SV3, the fourth opening-closing valve SV4, the fifth opening-closing valve SV5, the sixth opening-closing valve SV6, the seventh opening-closing valve SV7, and the eighth opening-closing valve SV8 are closed. Accordingly, the space in the reforming-reaction unit 5, the space in the first condenser 11 that is disposed more downstream than the reforming-reaction unit 5 is, and the space in the piping that is connected to these form an enclosed space about the first condenser 11. That is, an enclosed space is formed in such a state being closed by the fourth opening-closing valve SV4, fifth opening-closing valve SV5, sixth opening-closing valve SV6, eighth opening-closing valve SV8 and first drain valve SV1. Since the reforming-reaction unit 5 is cooled gradually after turning off the operation of the fuel-cell system, this enclosed space is cooled gradually. At this moment, within the enclosed space, the high-temperature fuel gas, which includes water vapor, is sealed. Therefore, the high-temperature fuel gas, which includes water vapor, is cooled while being kept to be enclosed within the enclosed space. As being accompanied by such cooling, the water vapor within the enclosed space condenses gradually in the inside of the enclosed space, and thereby condensed water is generated. The generated condensed water is accumulated in the bottom of the first condenser 11 by gravity. The first condenser 11 is thus set up. In this case, resulting from the decrement of the enclosed space's temperature, and resulting from the gas volumetric decrement when the water vapor within the enclosed space condenses, the inside of the enclosed space (the reforming-reaction unit 5, the inside of the first condenser 11, and the piping for these) turns into negative pressure.

According to the present embodiment, the pressure sensor 20 for detecting the pressure in the aforementioned enclosed space is not on board. That is, in aforementioned Embodiment No. 1, the inner pressure P1 in the first condenser 11 is detected with the pressure sensor 20. When the inner pressure P1 in the first condenser 11 has become the set pressure PA or more, the controller 40 is made so that it opens the first drain valve SV1, thereby supplying the condensed water within the first condenser 11 to the reservoir 7 by way of the first drain passage 11a and first drain valve SV1.

However, the present embodiment focuses on the fact that the volume of the aforementioned enclosed space has been known already. Also, it becomes known how much flow volume of the fuel gas should be sent to the reforming-reaction unit 5 and first condenser 11 in order that the inner pressure P1 in the first condenser 11 reaches the set pressure PA.

Figure 5:
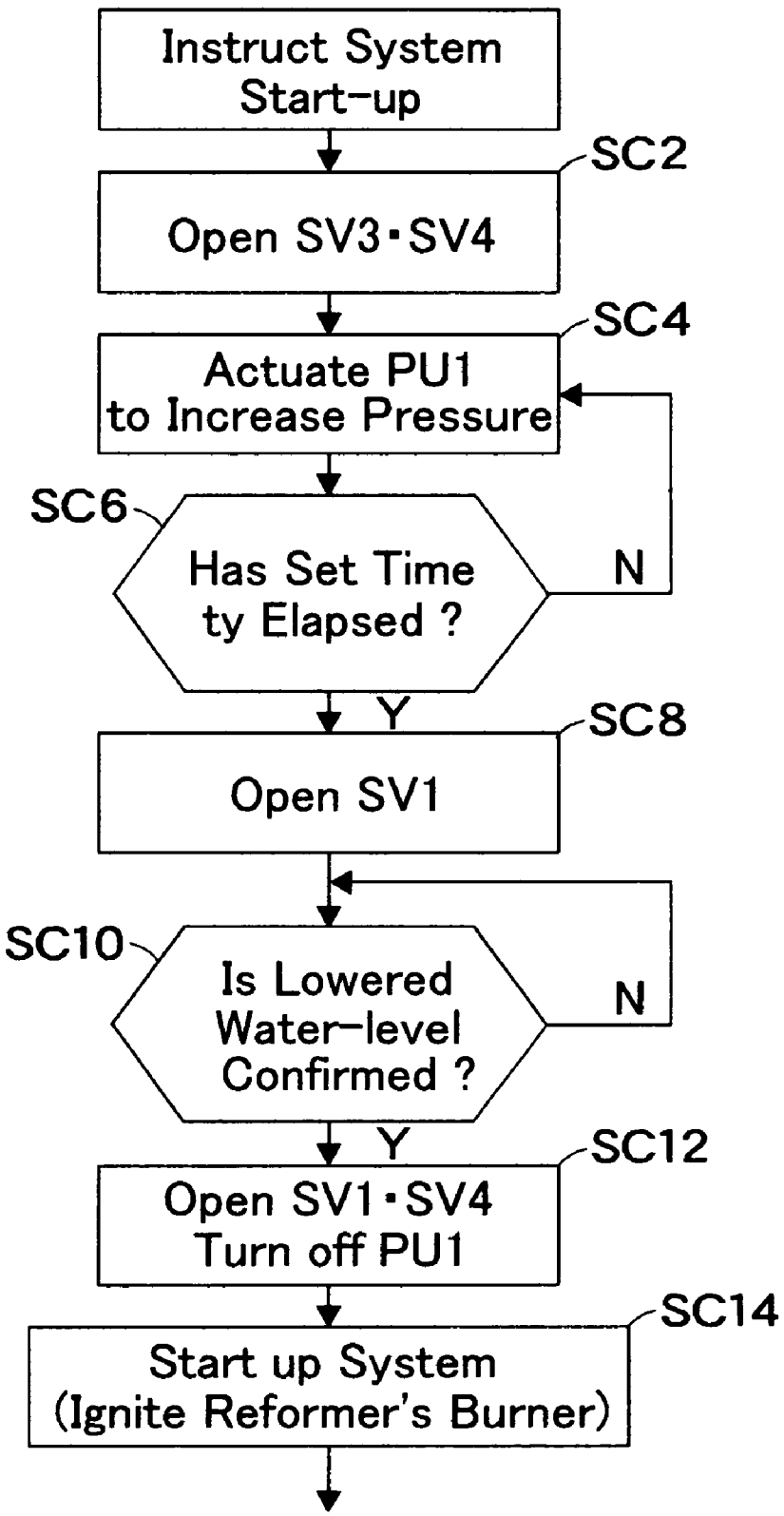
FIG. 5 is directed to Embodiment No. 2, and is a flow chart, which is directed to an example that a controller executes.

FIG. 5 illustrates an example of a flow chart of the inner-pressure increment and drain controls to be executed upon starting the start-up of the fuel-cell system. The flow chart shown in FIG. 5 approximates to the flow chart shown in FIG. 2 basically. That is, as shown in FIG. 5, the controller 40 opens the third opening-closing valve SV3 and fourth opening-closing valve SV4 (Step SC2). Further, the controller 40 drives the first pump PU1 (Step SC4). Thus, the fuel gas is supplied from the fuel-gas supply source 1 to the first condenser 11 via the reformer 4, and thereby the inner pressure P1 in the first condenser 11 increases. In order to judge whether the inner pressure P1 in the first condenser 11 is the set pressure PA or more, the controller 40 judges whether the driven time of the first pump PU1 have elapsed for a set time ty or not (Step SC6). The per-unit-time conveyable flow volume of the first pump PU1 has been known already. The volume of the enclose space being turned into negative pressure has been known already.

Accordingly, an input flow volume Q of the fuel gas being sent to the enclosed space is determined basically based on the per-unit-time conveyable flow volume of the first pump PU1 and the driven time of the first pump PU1. Therefore, when the controller 40 drives the first pump PU1 for the set time ty, it is possible to have the inner pressure P1 in the first condenser 11 reached the set pressure PA. Therefore, Step SC6 functions as means for judging whether the inner pressure P1 in the first condenser 11 is the set pressure PA or more or not depending on the driven time of the first pump PU1. Accordingly, when the driven time of the first pump PU1 has elapsed for the set time ty ("YES" at Step SC6), it is assumed that the inner pressure P1 in the first condenser 11 is the set pressure PA or more, and there is no fear of flowing backward. Accordingly, the first drain valve SV1 is opened (Step SC8).

By opening the first drain valve SV1, the water level in the first condenser 11 lowers. And so, the controller 40 judges whether the fact that the water level in the first condenser 11 has lowered is confirmed with the first water-level sensor 16 or not (Step SC10). When the water level in the first condenser 11 lowers by a predetermined amount ("YES" at Step SC10), the controller 40 closes the first drain valve SV1 and fourth opening-closing valve SV4, and additionally turns off the first pump PU1 (Step SC12). Thereafter, the controller 40 shifts to the start-up process for the fuel-cell system (Step SC14), and ignites the burner 6 of the reformer 4.

Figure 6:
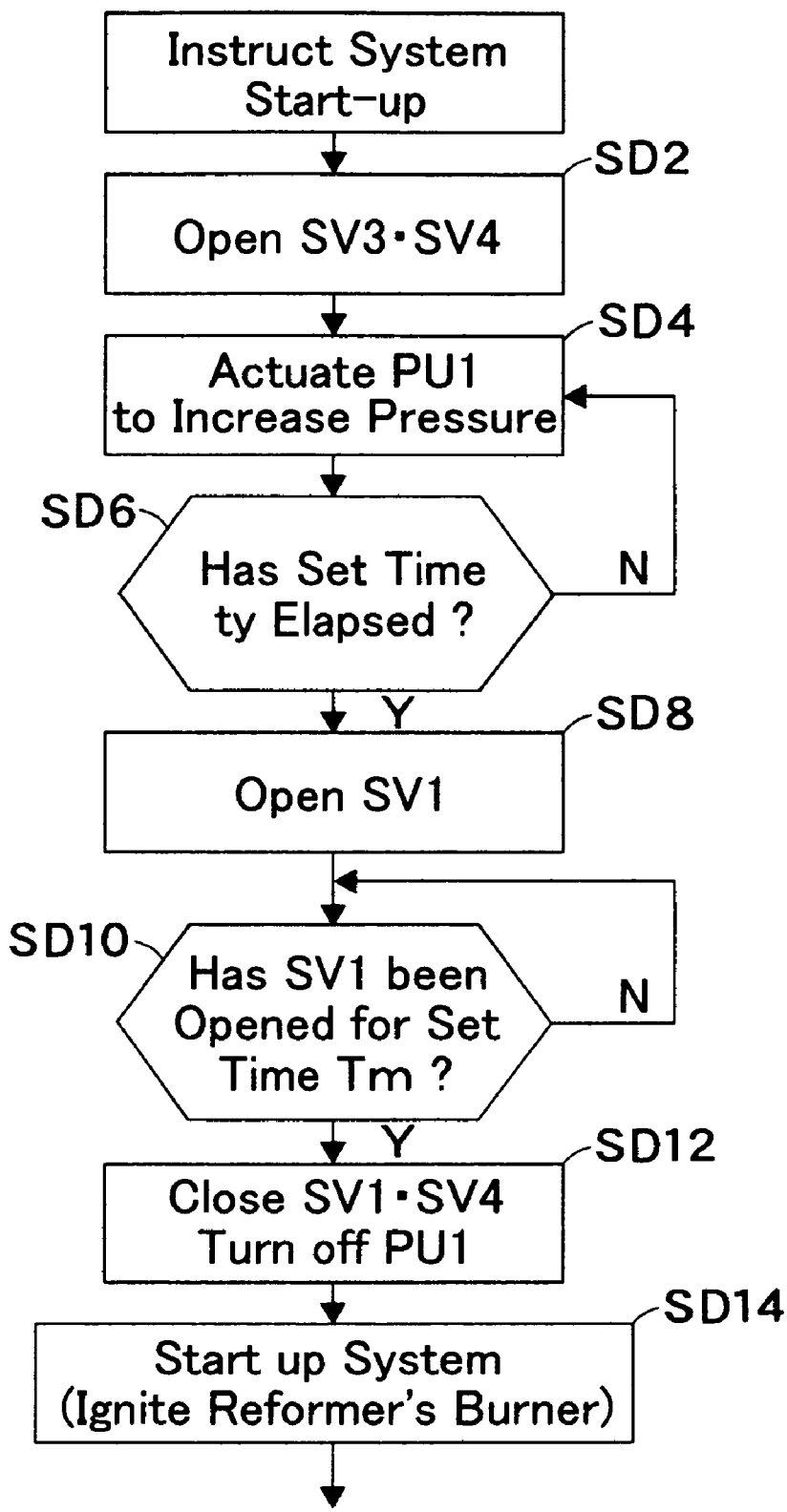
FIG. 6 is directed to Embodiment No. 2, and is a flow chart, which is directed to another example that the controller executes.

FIG. 6 illustrates another example of a flow chart on the inner-pressure increment and drain controls to be executed upon starting the start-up of the fuel-cell system, inner-pressure increment and drain controls which the controller 40 executes. The flow chart shown in FIG. 6 approximates to the flow charts shown in FIG. 3 and FIG. 5 basically. That is, as shown in FIG. 6, the controller 40 opens the third opening-closing valve SV3 and fourth opening-closing valve SV4 (Step SD2). Further, the controller 40 drives the first pump PU1 (Step SD4). Thus, the fuel gas is supplied from the fuel-gas supply source 1 to the first condenser 11 via the reformer 4, and thereby the inner pressure P1 in the first condenser 11 increases. In order to judge whether the inner pressure P1 in the first condenser 11 is the set pressure or more, the controller 40 judges whether the driven time of the first pump PU1 has elapsed for the set time ty or more or not (Step SD6). When the driven time of the first pump PU1 has elapsed for the set time ty ("YES" at Step SD6), it is assumed that the inner pressure P1 in the first condenser 11 is the set pressure PA or more (Step SB6). In this case, since there is no fear of flowing backward, the first drain valve SV1 is opened (Step SD8). By opening the first drain valve SV1, the water level in the condenser 11 lowers. And so, in order to confirm the fact that the water level in the first condenser 11 has lowered by a predetermined amount, the controller 40 judges whether the first drain valve SV1 has been opened for a set time Tm (Step SD10).

When the first drain valve SV1 has been opened for the set time Tm, it is assumed that the water level in the condenser 11 lowers by a predetermined amount. Accordingly, the controller 40 closes the first drain valve SV1 and fourth opening-closing valve SV4, and additionally turns off the first pump PU1 (Step SD12). Thereafter, the controller 40 shifts to the start-up process for the fuel-cell system (Step SD14), and ignites the burner 6 of the reformer 4. Aforesaid step SD10 functions as judging means for judging the fact that that the water level in the first condenser 11 has lowered by a predetermined amount.

[Embodiment No. 3]

Figure 7:
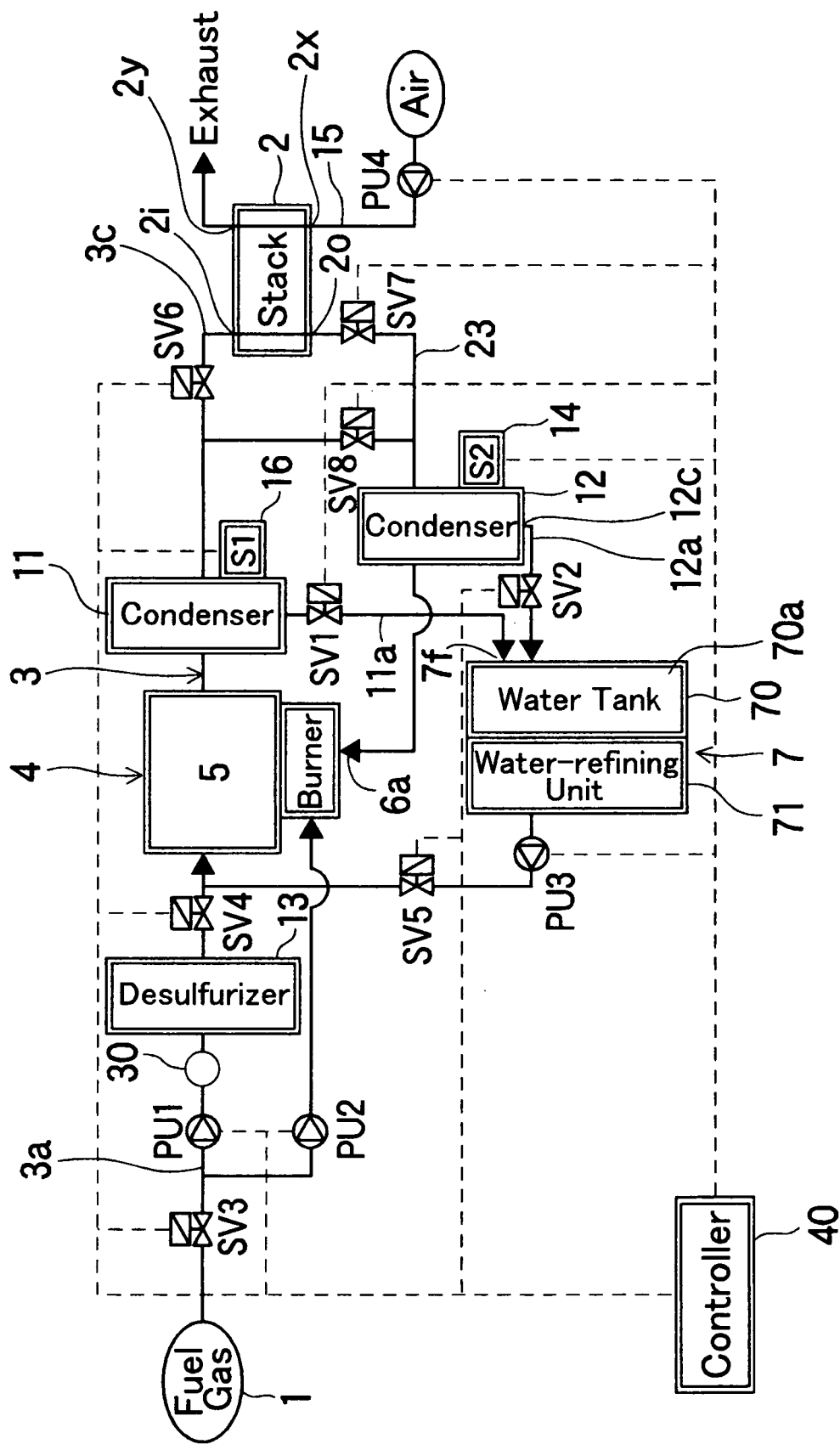
FIG. 7 is directed to Embodiment No. 3, and is a block diagram of a fuel-cell system.

Hereinafter, Embodiment No. 3 according to the present invention will be explained with reference to FIG. 7-FIG. 9. The present embodiment includes the same constructions and operations and/or effects as those of Embodiment No. 1 basically. Hereinafter, it will be explained with a central focus on parts that are different from those of Embodiment No. 1. FIG. 7 is the same constructions as those of FIG. 1 basically. However, as illustrated in FIG. 7, the pressure sensor 20 is abolished, and a flow-volume sensor 30 is disposed. The flow-volume sensor 30 is disposed, of the fuel-supply passage 3, upstream to the first condenser 11, namely, between the first pump PU1 and the reforming-reaction unit 5. The flow-volume sensor 30 can detect an input flow volume of the fuel gas being sent to the reforming-reaction unit 5. Therefore, an input flow volume Q being sent to the enclosed space can be detected by the flow-volume sensor 30.

Figure 8:
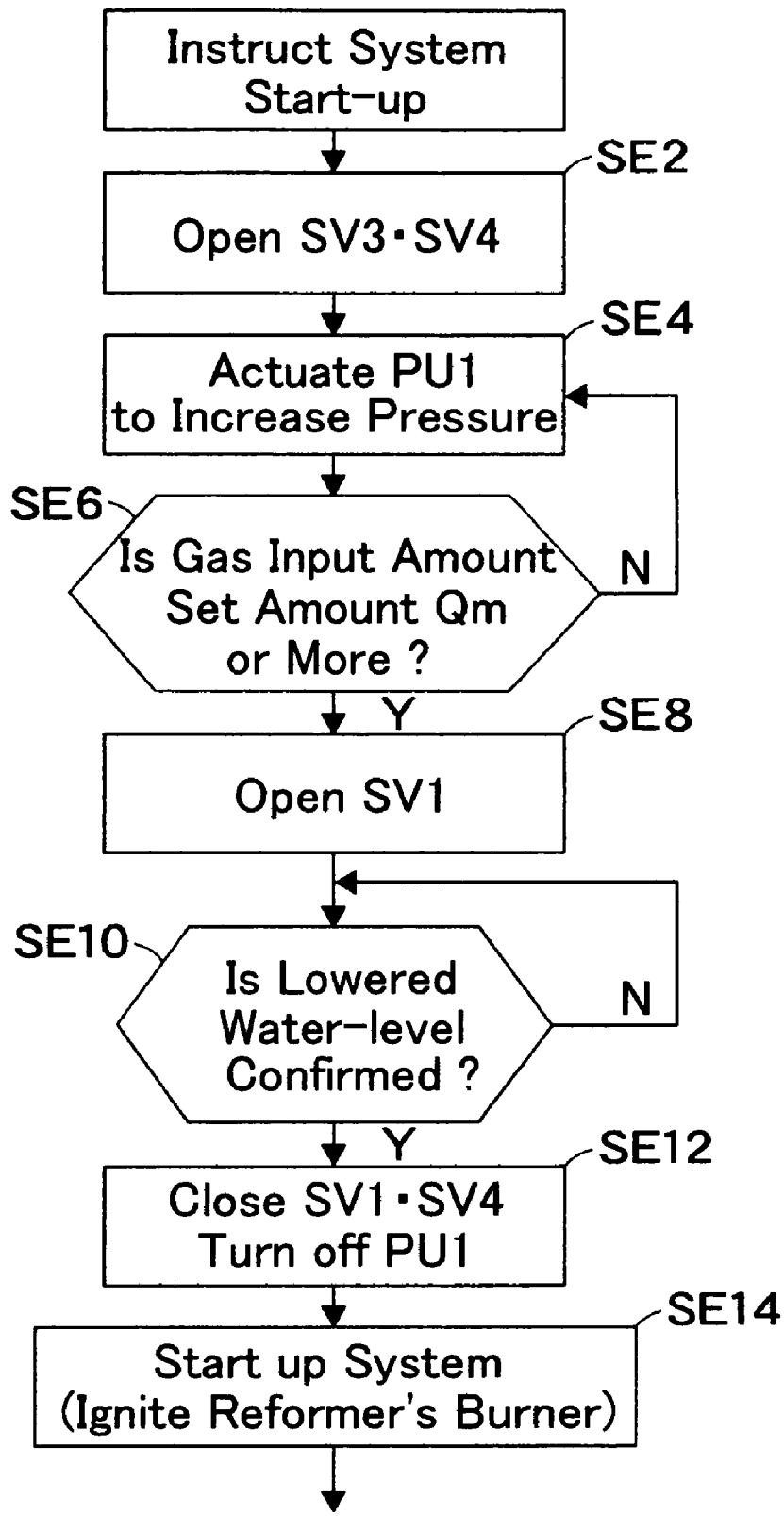
FIG. 8 is directed to Embodiment No. 3, and is a flow chart, which is directed to an example that a controller executes.

FIG. 8 illustrates an example of a flow chart on the inner-pressure increment and drain controls to be executed upon starting the start-up of the fuel-cell system, inner-pressure increment and drain controls which the controller 40 executes. The flow chart shown in FIG. 8 approximates to the flow charts shown in FIG. 2 and FIG. 5 basically. That is, as shown in FIG. 8, the controller 40 opens the third opening-closing valve SV3 and fourth opening-closing valve SV4 (Step SE2). Further, the controller 40 drives the first pump PU1 (Step SE4). Thus, the fuel gas is supplied from the fuel-gas supply source 1 to the first condenser 11 via the reformer 4, and thereby the inner pressure P1 in the first condenser 11 increases. In order to confirm whether the inner pressure P1 in the first condenser 11 is the set pressure Pa or more, the controller 40 judges whether an input amount Q of the fuel gas, which is detected at the flow-volume sensor 30, is a set amount Qm or more or not (Step SE6). When the input amount Q of the fuel gas is the set amount Qm or more ("YES" at Step SE6), there is no fear of backward flowing, because it is assumed that the inner pressure P1 in the first condenser 11 is the set pressure PA or more. Accordingly, the controller 40 opens the first drain valve SV1 (Step SE8). Therefore, Step SE6 functions as means for judging whether the inner pressure P1 in the first condenser 11 is the set pressure PA or more based on the input amount Q of the fuel gas without ever using the pressure sensor 20.

By opening the first drain valve SV1, the water level in the first condenser 11 lowers. And so, the controller 40 judges whether the first water-level sensor 16 has confirmed the fact that the water level in the first condenser 11 has lowered by a predetermined amount (Step SE10). When the water level in the first condenser 11 is judged to be lowered by a predetermined amount ("YES" at Step SC10), the controller 40 closes the first drain valve SV1 and fourth opening-closing valve SV4, and additionally turns off the first pump PU1 (Step SE12). Thereafter, the controller 40 shifts to the start-up control for the fuel-cell system (Step SE14), and ignites the burner 6 of the reformer 4.

Figure 9:
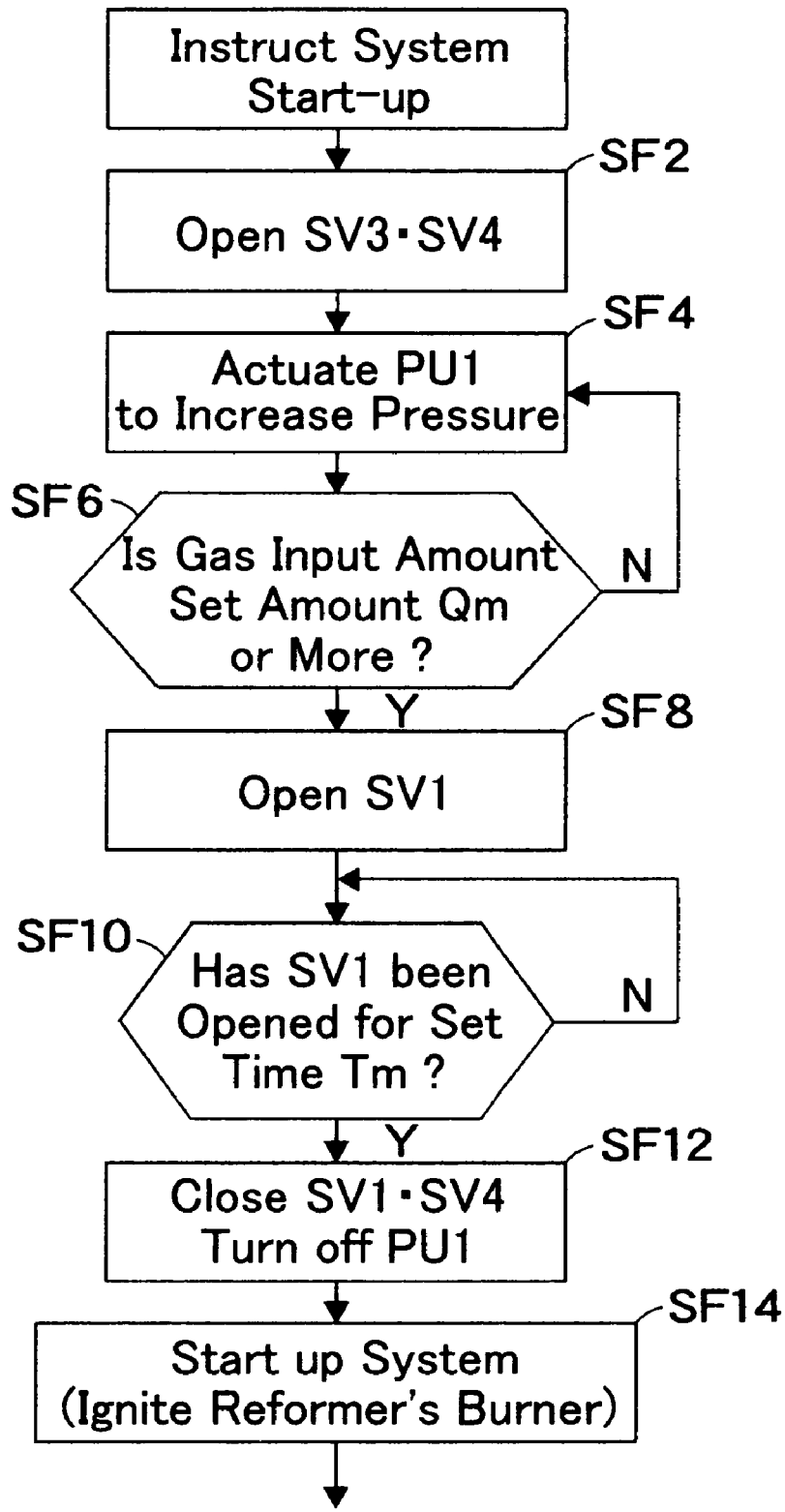
FIG. 9 is directed to Embodiment No. 3, and is a flow chart, which is directed to another example that the controller executes.

FIG. 9 illustrates another example of a flow chart of the inner-pressure increment and drain controls to be executed upon starting the start-up of the fuel-cell system. The flow chart shown in FIG. 9 approximates to the flow charts shown in FIG. 8 basically. That is, as shown in FIG. 9, the controller 40 opens the third opening-closing valve SV3 and fourth opening-closing valve SV4 (Step SF2). Further, the controller 40 drives the first pump PU1 (Step SF4). At this moment, the fifth opening-closing valve SV5, the sixth opening-closing valve SV6, the seventh opening-closing valve SV7, and the eighth opening-closing valve SV8 are also closed.

When the first pump PU1 is driven, since the fuel gas (before-reforming-reaction fuel gas) is supplied from the fuel-gas supply source 1 to the first condenser 11 via the reformer 4, the inner pressure P1 in the first condenser 11 increases. In order to confirm whether the inner pressure P1 in the first condenser 11 is the set pressure PA or more, the controller 40 judges whether the input amount Q of the fuel gas, which is detected at the flow-volume sensor 30, is the set amount Qm or more or not (Step SF6). When the input amount Q of the fuel gas is the set amount Qm or more ("YES" at Step SF6), it is assumed that the inner pressure P1 in the first condenser 11 is the set pressure PA or more. In this case, since there is hardly any fear of flowing backward, the controller 40 opens the first drain valve SV1 (Step SF8). By opening the first drain valve SV1, the water level in the first condenser 11 lowers. And so, the fact that the water level in the first condenser 11 has lowered by a predetermined amount is confirmed. Accordingly, the controller 40 judges whether the first drain valve SV1 has opened for a set time Tm or not (Step SF10). When the first drain valve SV1 has opened for the set time Tm ("YES" at Step SF10), it is assumed that the water level in the first condenser 11 has lowered by a predetermined amount. And so, the controller 40 closes the first drain valve SV1 and fourth opening-closing valve SV4, and additionally turns off the first pump PU1 (Step SF12). Thereafter, the controller 40 shifts to the start-up process for the fuel-cell system (Step SF14), and ignites the burner 6 of the reformer 4.

[Embodiment No. 4]

Hereinafter, Embodiment No. 4 according to the present invention will be explained with reference to FIG. 10 and FIG. 11. The present embodiment includes the same constructions and operations and/or effects as those of Embodiment No. 1 basically. Therefore, FIG. 1 will be applied correspondingly. Hereinafter, it will be explained with a central focus on parts that are different from those of Embodiment No. 1. In the present embodiment, when starting up the operation of the present system, a function is added, function which is for confirming whether there is gas leakage or not in the enclosed space (the reforming-reaction unit 5, first condenser 11 and piping being connected to these).

The reforming-reaction unit 5 and its periphery are turned into such a state that stress is violent being accompanied by temperature changes, because the start-up and turning-off of the present system are repeated. Further, there is a fear that the present system might be used under unexpected severe conditions. Therefore, it is preferable to devise countermeasures for the possibility of mechanical breakage, such as welded portions, and for leakage from sealed parts in order to improve the reliability.

Regarding this point, according to the present embodiment, prior to the start-up of the present system, that is, prior to igniting the burner 6, the controller 40 confirms whether there is gas leakage or not in the enclosed space by increasing the inner pressure P1 in the enclosed space in advance. Accordingly, before igniting the burner 6, the controller 40 feeds the fuel gas to the reforming-reaction unit 5 and first condenser 11, thereby increasing the inner pressure P1 in the enclosed space. And, while the controller 40 opens the first drain valve SV1 to discharge the water in the first condenser 11, it confirms existence and nonexistence of lowering of the inner pressure P1 in the enclosed space by the pressure sensor 20.

Concretely, when the start-up direction of the present system is instructed, the controller 40 opens the third opening-closing valve SV3 and fourth opening-closing valve SV4, which are disposed upstream to the first condenser 11, and additionally drives the first pump PU1. At this moment, the first drain valve SV1 is closed. The fifth opening-closing valve SV5, the sixth opening-closing valve SV6, the seventh opening-closing valve SV7, and the eighth opening-closing valve SV8 are also closed. By driving the first pump PU1, the pressure P1 inside said enclosed space is increased. And, when a pressure value of the pressure sensor 20, that is, when the inside pressure P1 becomes a set pressure PE (either being identical with PA or being different therefrom is allowable) or more, in such a state, the controller 40 turns off the first pump PU1, and additionally retains it therein for a set time Tw. And, after retaining it therein for the set time Tw, it rereads a pressure value of the pressure sensor 20, and obtains a difference ΔP between the pressure value of the last round and the pressure value of this round by calculation. When that difference ΔP is a set pressure value ΔPF or less, the controller 40 judges that there is not any gas leakage in the piping, and the like. Since there is not any leakage in the piping, and the like, it is allowable to supply the fuel gas. And so, the controller 40 opens the first drain valve SV1. The later manipulations are conducted in the same manner as Embodiment No. 1. When the changed difference ΔP surpasses the set pressure ΔPF, the pressure lowering is so large that there is a fear of gas leakage in the enclosed space. Hence, the controller 40 judges that there is abnormality, and outputs an alarm signal to an alarming element. Moreover, when the pressurizing time lasts for a set time or more in increasing the pressure in the enclosed space by driving the first pump PU1, the controller 40 makes an abnormal judgment.

Figure 10:
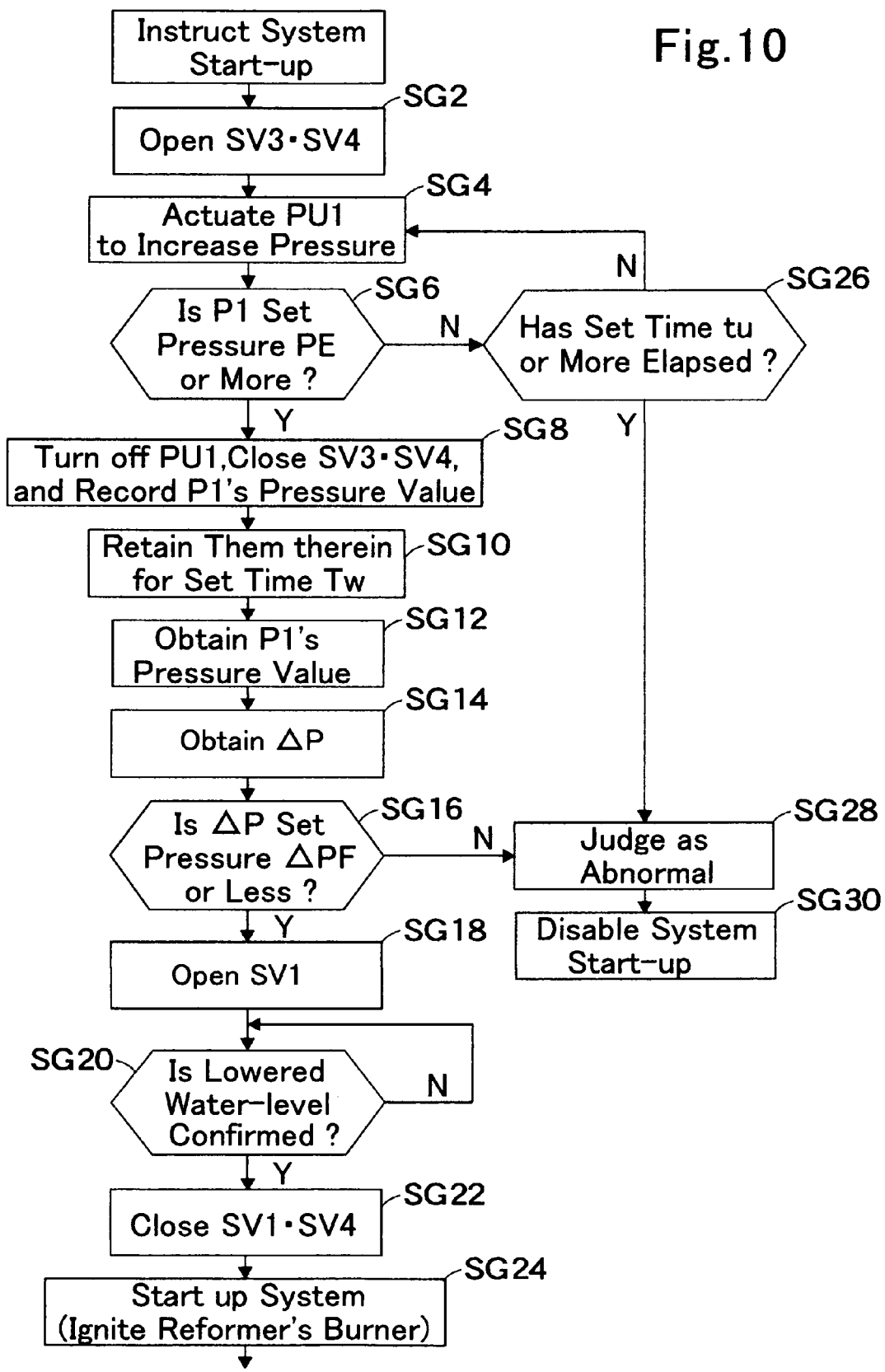
FIG. 10 is directed to Embodiment No. 4, and is a flow-chart, which is directed to an example that a controller executes.

FIG. 10 illustrates an example of a flow chart of the inner-pressure increment and drain controls to be executed upon starting the start-up of the fuel-cell system. Upon starting the start-up, the first drain valve SV1 is closed. The fifth opening-closing valve SV5, the sixth opening-closing valve SV6, the seventh opening-closing valve SV7, and the eighth opening-closing valve SV8 are also closed. As shown in FIG. 10, the third opening-closing valve SV3 and fourth opening-closing valve SV4 are opened (Step SG2). Further, the first pump PU1 is driven (Step SG4). Thus, the fuel gas is supplied from the fuel-gas supply source 1 to the first condenser 11 via the reformer 4, and thereby the inner pressure P1 in the first condenser 11 increases. The controller 40 judges whether the inner pressure P1 in the first condenser 11 is the set pressure PE or more (Step SG6). When the inner pressure P1 is the set pressure PE or more ("YES" at Step SG6), the controller 40 turns off the first pump PU1, and additionally closes the third opening-closing valve SV3 and fourth opening-closing valve SV4, and further records a pressure value of the inside pressure P1, which the pressure sensor 20 detects at that moment.

The controller 40 retains it as being kept in the enclosed state at that state (Step SG10). And, the controller 40 records a pressure value of the pressure sensor 20 that is after the set time Tw has elapsed (Step SG12). The controller 40 obtains the difference ΔP between the pressure values of the pressure sensor 20, which are before and after the set time Tw has elapsed, (Step SG14). The controller 40 judges whether the difference ΔP is the set pressure ΔPF or less (Step SG16).

When the difference ΔP is the set pressure ΔPF or less, it is assumed that there is no gas leakage in the enclosed space. Accordingly, the first drain valve SV1 is opened (Step SG18). By opening the first drain valve SV1, the water level in the first condenser 11 lowers. And so, the controller 40 judges with the first water-level sensor 16 the fact that the water level in the first condenser 11 has lowered by a predetermined amount (Step SG20). When the water level in the first condenser 11 has lowered by a predetermined amount ("YES" at Step SG20), the controller 40 closes the first drain valve SV1 and fourth opening-closing valve SV4 (Step SG22). Thereafter, the controller 40 shifts to the start-up process for the fuel-cell system (Step SG24), and ignites the burner 6 of the reformer 4.

Moreover, as a result of the judgment at Step SG6, when the inner pressure P1 in the first condenser 11 is judged not to be the set pressure PE or more ("NO" at Step SG6), the pressure-increment rate of the inner pressure P1 is slow. Accordingly, the controller 40 judges whether the driven time of the first pump PU1 has elapsed for a set time tu or more or not (Step SG26). When the driven time of the first pump PU1 has not elapsed for the set time tu or more ("NO" at Step SG26), the controller 40 returns to Step S4. When the driven time of the first pump PU1 has elapsed for the set time tu or more ("YES" at Step SG26), it takes too much time to increase the pressure in the first condenser 11. In this case, since there is a fear of gas leakage in the first condenser 11 and the piping being connected to this, and the like, the controller 40 judges that abnormality occurs (Step SG28). Further, the controller 40 outputs a signal for disenabling the system to start up (Step SG30). Note that Step SG26 functions as judging means for judging whether there is gas leakage in the enclosed space or not upon the start-up of the present system based on the pressure-increment time for the enclosed space. Since the gas-leakage detection with respect to the reforming-reaction unit 5 and first condenser 11 is thus executed every time the system is started up, it is possible to enhance the reliability.

Figure 11:
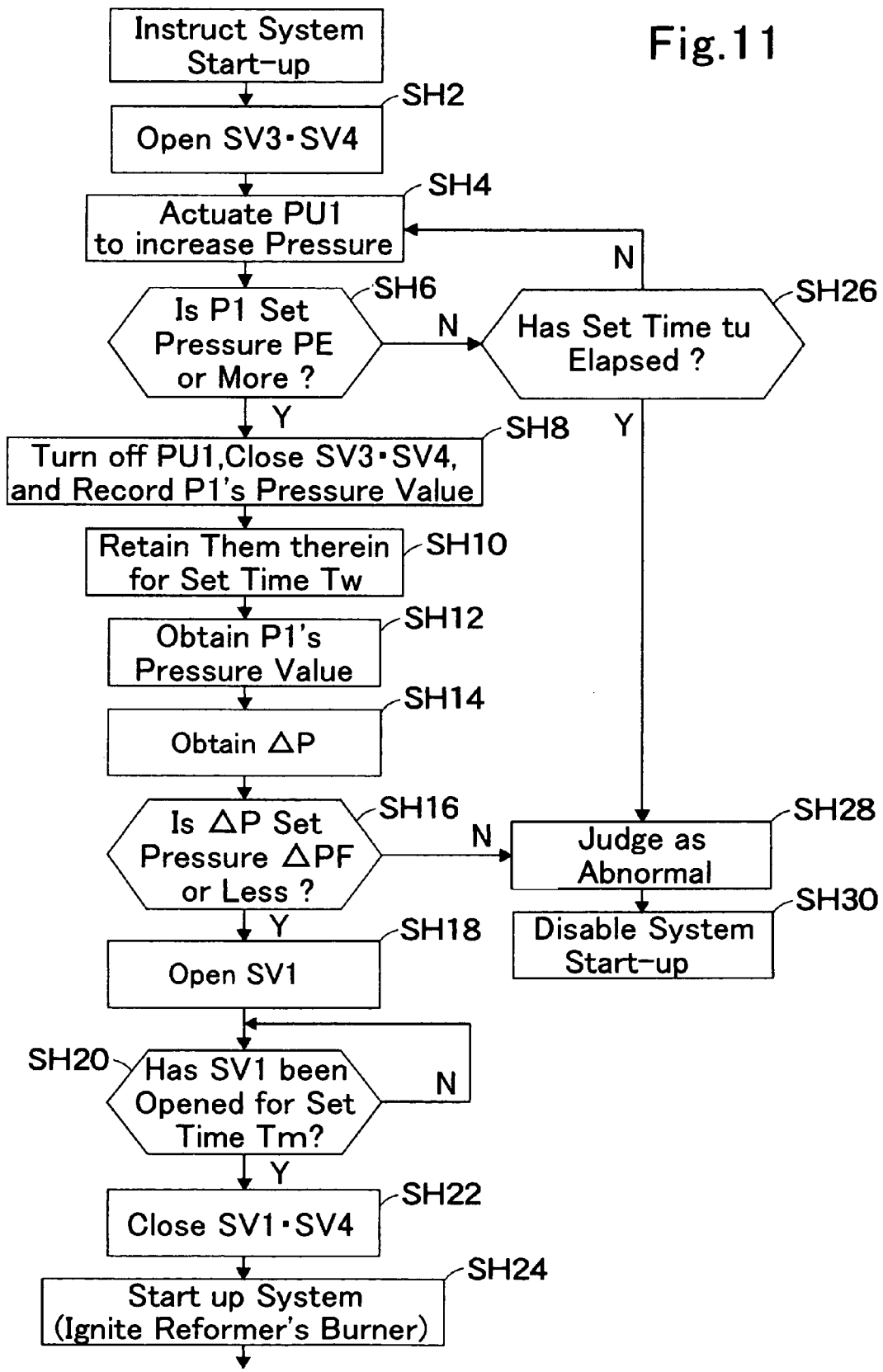
FIG. 11 is directed to Embodiment No. 4, and is a flow chart, which is directed to another example that the controller executes.

FIG. 11 illustrates another example of a flow chart of the inner-pressure increment and drain controls to be executed upon starting the start-up of the fuel-cell system. As shown in FIG. 11, the controller 40 opens the third opening-closing valve SV3 and fourth opening-closing valve SV4 (Step SH2). Further, the controller 40 drives the first pump PU1 (Step SH4). Thus, the fuel gas is supplied from the fuel-gas supply source 1 to the first condenser 11 via the reformer 4, and thereby the inner pressure P1 in the first condenser 11 increases. The controller 40 judges whether the inner pressure P1 in the first condenser 11 is the set pressure PE or more (Step SH6). When the inner pressure P1 is the set pressure PE or more ("YES" at Step SH6), the controller 40 turns off the first pump PU1, and additionally closes the third opening-closing valve SV3 and fourth opening-closing valve SV4, and records a pressure value of the pressure sensor 20 at that moment (Step SH8).

The controller 40 retains them in such a state for a set time Tw (Step SH10). It records a pressure value of the pressure sensor 20 after the set time Tw has elapsed (Step SH12). The controller 40 obtains the difference ΔP between the pressure values of the pressure sensor 20 that are before and after the set time Tw has elapsed (Step SH14). The controller 40 judges whether the difference ΔP is the set pressure ΔPF or less or not (Step SH16). When the difference ΔP is the set pressure ΔPF or less, since there is hardly any pressure decrement in the enclosed space substantially or it is less, it is assumed that there is hardly any gas leakage in the enclosed space ("YES" at Step SH16). Accordingly, the controller 40 opens the first drain valve SV1, thereby introducing the fuel gas into the reforming-reaction unit 5 and first condenser 11 (Step SH18). By the elapsing of the time for opening the first drain valve SV1, the water level in the first condenser 11 lowers. And so, it judges whether the first drain valve SV1 has opened for a set time Tm or more or not (Step SH20). When the first drain valve SV1 has opened for the set time Tm or more ("YES" at Step SH20), it closes the first drain valve SV1 and fourth opening-closing valve SV4 (Step SH22). Thereafter, the controller 40 shifts to the start-up process for the fuel-cell system (Step SH24), and ignites the burner 6 of the reformer 4.

Moreover, as a result of the judgment at Step SH6, when the inner pressure P1 in the first condenser 11 is judged not to be the set pressure PE or more ("NO" at Step SH6), it takes too much time for increasing the inner pressure P1. Hence, the controller 40 judges whether the driven time of the first drain pump PU1 has elapsed for the set time tu or more (Step SH26). When the driven time of the first pump PU1 has not elapsed for the set time tu or more ("NO" at Step SH26), it returns to Step S4. When the driven time of the first pump PU1 has elapsed for the set time tu or more ("YES" at Step SH26), since it takes too much time to increase the inner pressure P1, the controller 40 judges that abnormality occurs (Step SH28), and additionally outputs a signal for disenabling the system to start up (Step SH30).

[Example No. 5]

Figure 12:
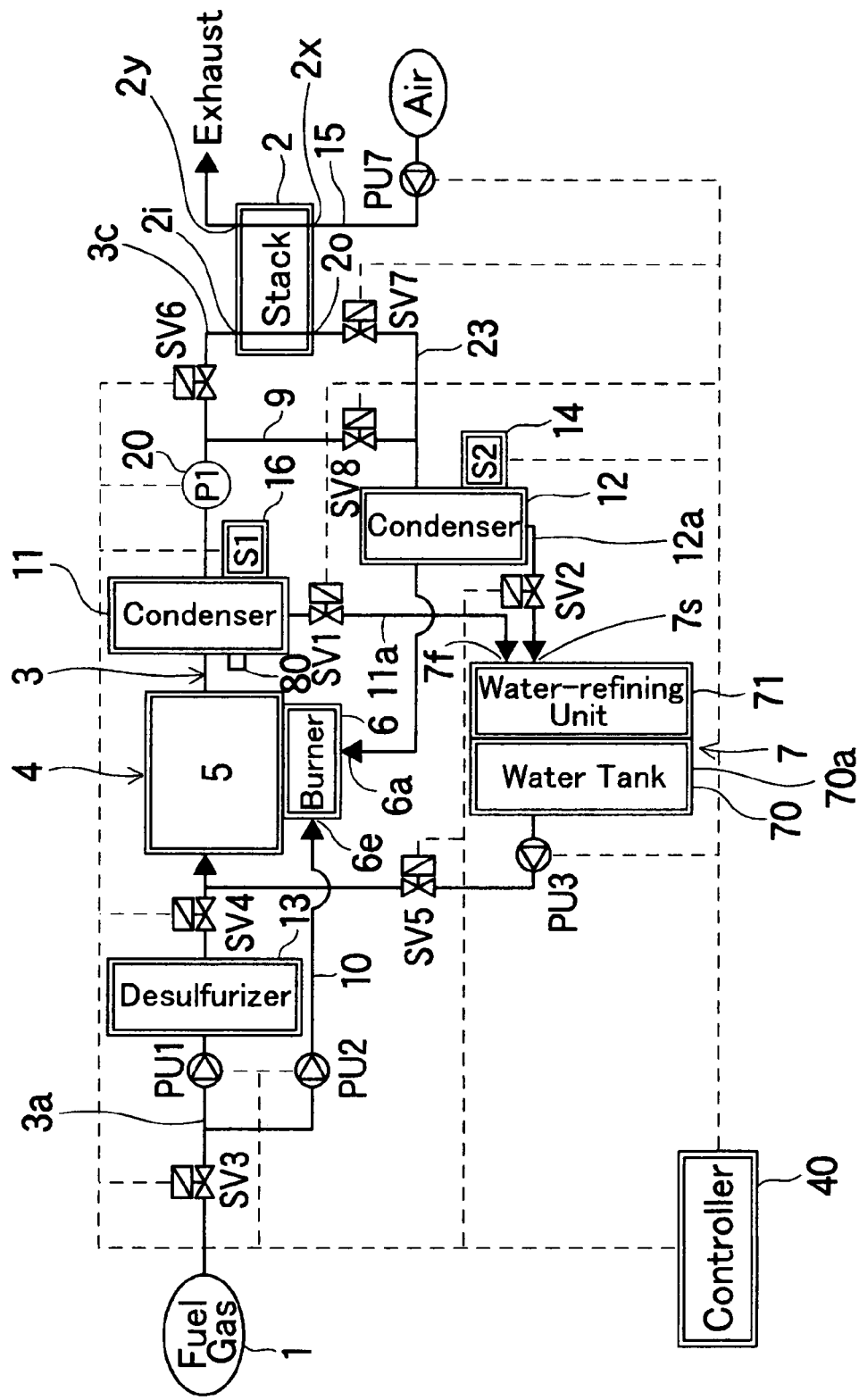
FIG. 12 is directed to Embodiment No. 5, and is a block diagram of a fuel-cell system.
Figure 13:
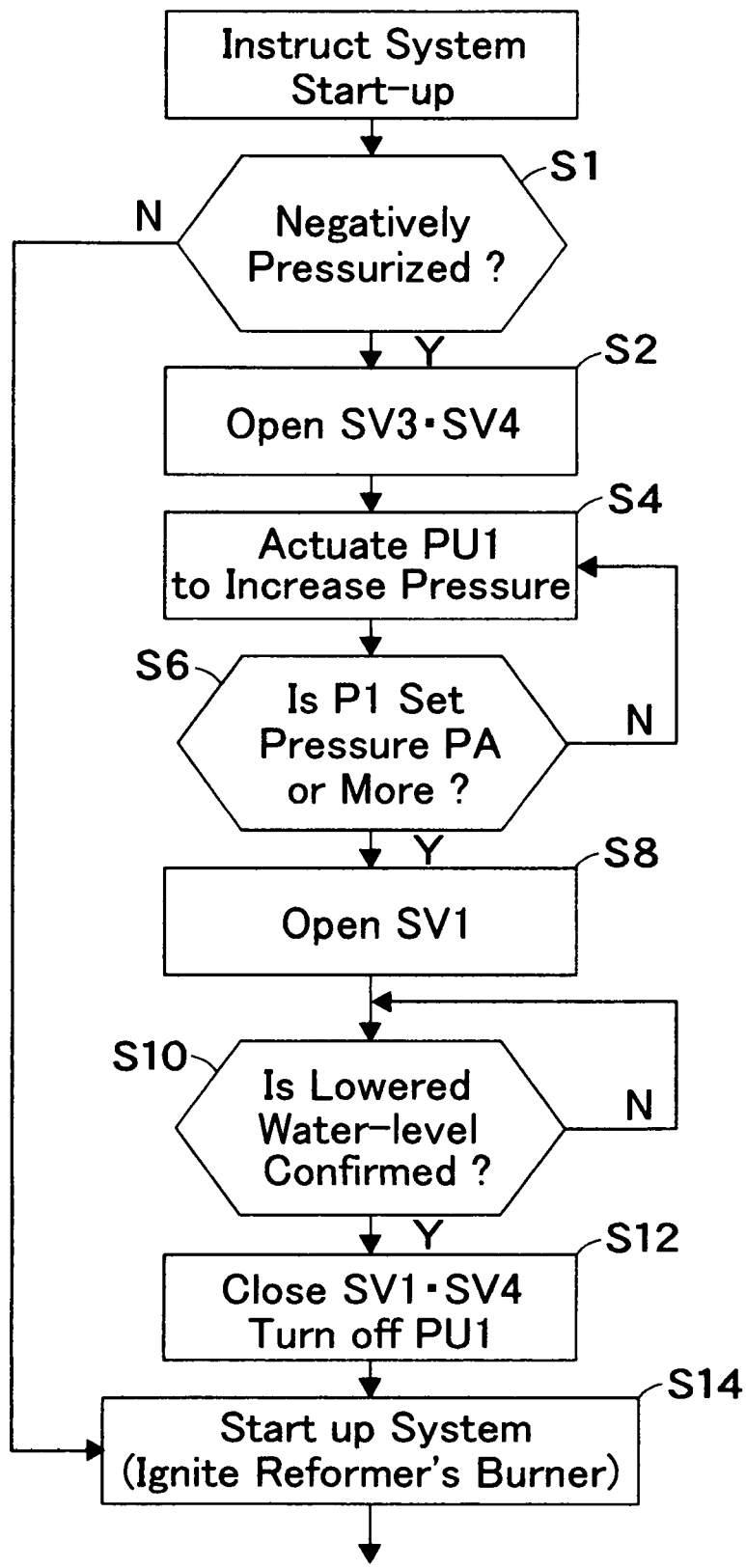
FIG. 13 is directed to Embodiment No. 5, and is a flow chart, which is directed to an example that a controller executes.

Hereinafter, Embodiment No. 5 according to the present invention will be explained with reference to FIG. 12 and FIG. 13. The present embodiment includes the same constructions and operations and/or effects as those of Embodiment No. 1 basically. FIG. 12 approximates to FIG. 1 basically. FIG. 13 approximates to the flow chart of FIG. 2 basically. Hereinafter, it will be explained with a central focus on parts that differ. As illustrated in FIG. 12, the reservoir 7 has a water-reserving unit 70, which has a reservoir chamber 70a for reserving water, and a water-refining unit 71 for refining the water, which is reserved in the water-reserving unit 70. Unlike Embodiment No. 1, the water-refining unit 71 is arranged on a nearer side to the first condenser 11 than the water-reserving unit 70 is; is connected to the first condenser 11 by way of the first drain passage 11a and first drain valve SV1; and is connected to the second condenser 12 by way of the second drain passage 12a and second drain valve SV2. As shown in FIG. 12, the water-reserving unit 70 is arranged on a farther side with respect to the first condenser 11 than the water-refining unit 71 is. At the reservoir 7, water, which is purified by being refined at the water-refining unit 71, is reserved in the water-reserving unit 70.

Moreover, in the same manner as Embodiment No. 1, the pressure sensor 20, which detects the pressure in the space of the reforming-reaction unit 5, first condenser 11, piping being connected to these, is disposed as shown in FIG. 12. According to the present embodiment, the controller 40 judges the existence or nonexistence of negative pressurization in that enclosed space upon carrying out the next round of start-up after turning off the present system (Step S1). Step S1 functions as means for judging negative pressurization in that enclosed space. When a pressure value of the pressure sensor 20 is a predetermined value P10 (a threshold value for judging negative pressurization) or less, the enclosed space is judged to turn into negative pressure ("YES" at Step S1). Accordingly, in the same manner as Embodiment No. 1, the controller 40 executes Step S2-Step S12 as shown in FIG. 13, thereby carrying out the inner-pressure increment and drain controls in which the first drain valve SV1 is switched to the opened state after increasing the inner pressure in the first condenser 11. In this case, even when that space is pressurized negatively as described above, the water in the reservoir 7 is prevented from flowing backward to the first condenser 11.

However, when the pressure value of the pressure sensor 20 is higher than a predetermined value P11 upon the start-up of the system, it is assumed that, though the enclosed space is cooled, the cooling is not sufficient so that the enclosed space does not reach negative pressurization ("NO" at Step S1). Accordingly, when the pressure value of the pressure sensor 20 is higher than the predetermined value P11, the controller 40 proceeds from Step S1 to Step S14; and, in order to start up the present system without executing the aforementioned inner-pressure increment and drain controls, the controller 40 opens the third opening-closing valve SV3 in such a state that the fourth opening-closing valve SV4 is closed, and additionally drives the second pump PU2 to ignite the burner 6, thereby heating the reforming-reaction unit 5. Since it omits the aforementioned inner-pressure increment and drain controls, it is advantageous for shortening the time required for the start-up.

Further, according to the present embodiment, a temperature sensor 80, which detects temperatures of the enclosed space to be enclosed, is disposed. When the temperature of the temperature sensor 80 is lower than a predetermined temperature T10, it is highly likely that there is a fear that the enclosed space has been pressurized negatively as described above, because a long time has elapsed since the time the present system is turned off so that the enclosed space is cooled sufficiently. Accordingly, as described above, the controller 40 carries out the inner-pressure increment and drain controls in which the first drain valve SV1 is switched to the opened state after increasing the inner pressure P1 in the first condenser 11. In this case, the backward flowing of the water in the reservoir 7, which results from negative pressure, is prevented as described above.

However, upon starting up the present system after turning off the operation, when the temperature of the temperature sensor 80 is higher than the predetermined temperature T10, it is assumed that negative pressurization being accompanied by the cooling of the enclosed space does not occur ("NO" at Step S1), because not so much time has elapsed since the time the present system is turned off so that, as a result, the enclosed space is not cooled too much, and so that the enclosed space is warm. It is assumed that the backward flowing is also less likely to occur. When the temperature of the temperature sensor 80 is thus higher than the predetermined temperature T10, the controller 40 shifts from Step S1 to Step S14; and, in order to start up the present system without executing the aforesaid inner-pressure increment and drain controls, it ignites the burner 6, thereby heating the reforming-reaction unit 5. Since it omits the aforesaid inner-pressure increment and drain controls, it is possible to shorten the time required for the start-up of the present system. As aforesaid, the negative pressurization in the enclosed space is detected by the pressure signal by the pressure sensor 20 and/or by the temperature signal by the temperature sensor 80.

As described above, in the reservoir 7, the water, which is refined to be purified at the water-refining unit 71, is reserved in the water-reserving unit 70. Due to unanticipated circumstances, if the water in the water-refining unit 71 should have flowed backward to the first condenser 11, the contamination of piping, and the like, is prevented because the water in the water-refining unit 71 is decontaminated.

(Other Embodiments)

It is allowable that the aforesaid inner-pressure increment and drain controls can be carried out before igniting the burner 6 of the reformer 4 (that is, before starting up the reformer 4); and, not limited to this, it is allowable to carry out the inner-pressure increment and drain controls in the middle of starting up the reformer 4. In this case, it is possible to carry it out in the following manners, for instance:

(1) the burner 6 is ignited, and raw-material water is sent to an evaporator;

(2) raw-material water turns into water vapor at an evaporator, and the water vapor is sent to the reforming-reaction unit 5;

(3) the fuel gas (raw-material gas for reforming) is sent to the reforming-reaction unit 5 after a predetermined time; and (4) the reforming reaction begins at the reforming unit.

The drain-process action can be put into operation by either one of the following (depending on pressures at that time).

When the inner pressure increases to a predetermined pressure or more by water vapor alone, carrying out the drain process at the stage of (2).

When a total pressure of water vapor and raw-material gas for reforming increases to a predetermined pressure or more, carrying out the drain process at the initial stage of (3).

When a total pressure of water vapor, raw-material gas for reforming and fuel gas being reformed partially increases to a predetermined pressure or more, carrying out the drain process at the initial stage of (3).

The present invention is not limited to the embodiments, which have been set forth above and illustrated in the drawings, but is enforceable by changing or modifying appropriately within ranges not departing from the spirit or scope thereof. Although the reservoir 7 includes the water-reserving unit 70 and the water-refining unit 71, it is allowable that the water-refining unit 71 can be separated from the reservoir 7. In the aforesaid embodiments, although it is applied to the condenser that is disposed in the passage in which fuel gas flows, it is allowable that it can be applied to a condenser that is disposed in a passage in which oxidizing-agent gas flows.

Industrial Applicability

The present invention can avail itself of fuel-cell systems for vehicle, for stationary, for electric equipment, for electronic equipment, and for portable, for instance.

Figure Captions

FIG. 1: Fuel Gas
  Desulfurizer
  Condenser
  Exhaust
  Burner
  Stack
  Condenser
  Air
  Water-refining Unit
  Water Tank
  Controller
FIG. 2: Instruct System Start-up
  Open SV3/SV4
  Actuate PU1 to Increase Pressure
  Is P1 Set Pressure PA or More?
  Open SV1
  Is Lowered Water-level Confirmed?
  Close SV1/SV4
  Turn Off PU1
  Start up System
  (Ignite Reformer's Burner)
FIG. 3: Instruct System Start-up
  Open SV3/SV4
  Actuate PU1 to Increase Pressure
  Is P1 Set Pressure PA or More?
  Open SV1
  Has SV1 been Opened for Set Time Tx?
  Close SV1/SV4
  Turn Off PU1
  Start up System
  (Ignite Reformer's Burner)
FIG. 4: Fuel Gas
  Desulfurizer
  Condenser
  Exhaust
  Burner
  Stack
  Condenser
  Air
  Water-refining Unit
  Water Tank
  Controller
FIG. 5: Instruct System Start-up
  Open SV3/SV4
  Actuate PU1 to Increase Pressure
  Has Set Time ty Elapsed?
  Open SV1
  Is Lowered Water-level Confirmed?
  Close SV1/SV4
  Turn Off PU1
  Start up System
  (Ignite Reformer's Burner)
FIG. 6: Instruct System Start-up
  Open SV3/SV4
  Actuate PU1 to Increase Pressure
  Has Set Time ty Elapsed?
  Open SV1
  Has SV1 been Opened for Set Time Tm?
  Close SV1/SV4
  Turn Off PU1
  Start up System
  (Ignite Reformer's Burner)
FIG. 7: Fuel Gas
  Desulfurizer
  Condenser
  Exhaust
  Burner
  Stack
  Condenser
  Air
  Water-refining Unit
  Water Tank
  Controller
FIG. 8: Instruct System Start-up
  Open SV3/SV4
  Actuate PU1 to Increase Pressure
  Is Gas Input Amount Set Amount Qm or More?
  Open SV1
  Is Lowered Water-level Confirmed?
  Close SV1/SV4
  Turn Off PU1
  Start up System
  (Ignite Reformer's Burner)
FIG. 9: Instruct System Start-up
  Open SV3/SV4
  Actuate PU1 to Increase Pressure
  Is Gas Input Amount Set Amount Qm or More?
  Open SV1
  Has SV1 been Opened for Set Time Tm?
  Close SV1/SV4
  Turn Off PU1
  Start up System
  (Ignite Reformer's Burner)
FIG. 10: Instruct System Start-up
  Open SV3/SV4
  Actuate PU1 to Increase Pressure
  Is P1 Set Pressure PE or More?
  Turn Off PU1, Close SV3/SV4, and Record P1's pressure
  Valve
  Retain Them therein for Set Time Tw
  Obtain P1's Pressure Value
  Obtain ΔP
  Is ΔP Set Pressure ΔPF or Less?
  Open SV1
  Is Lowered Water-level Confirmed?
  Close SV1/SV4

Turn Off PU1
Start up System
(Ignite Reformer's Burner)
Has Set Time tu or More Elapsed?
Judge as Abnormal
Disable System Start-up
FIG. 11: Instruct System Start-up
　Open SV3/SV4
　Actuate PU1 to Increase Pressure
　Is P1 Set Pressure PE or More?
　Turn Off PU1, Close SV3/SV4, and Record P1's Pressure Value
　Retain Them therein for Set Time Tw
　Obtain P1's Pressure Value
　Obtain ΔP
　Is ΔP Set Pressure ΔPF or Less?
　Open SV1
　Has SV1 been Opened for Set Time Tm?
　Close SV1/SV4
　Turn Off PU1
　Start up System
　(Ignite Reformer's Burner)
　Has Set Time tu or More Elapsed?
　Judge as Abnormal
　Disable System Start-up
FIG. 12: Fuel Gas
　Desulfurizer
　Condenser
　Exhaust
　Burner
　Stack
　Condenser
　Air
　Water Tank
　Water-refining Unit
　Controller
FIG. 13: Instruct System Start-up
　Negatively Pressurized?
　Open SV3/SV4
　Actuate PU1 to Increase Pressure
　Is P1 Set Pressure PA or More?
　Open SV1
　Is Lowered Water-level Confirmed?
　Close SV1/SV4
　Turn Off PU1
　Start up System
　(Ignite Reformer's Burner)

The invention claimed is:

1. A fuel-cell system, comprising:
a reformer being heated by a burner, thereby generating reactant gas from fuel;
a fuel cell for generating electric power by reactant gas;
a condenser for generating condensed water by condensing water content, which is included in the reactant gas to be supplied to said fuel cell or in off gas of the reactant gas; and
a reservoir for reserving the condensed water being created in said condenser,
wherein the fuel-cell system further comprises:
(i) a drain valve being disposed between said condenser and said reservoir, and being capable of switching between a closed state, in which communication between said condenser and said reservoir is shut off, and an opened state, in which said condenser is communicated with said reservoir to discharge the water in said condenser to the reservoir; and
(ii) a controller programmed to carry out inner-pressure increment and drain controls in which said drain valve is put into the opened state after increasing inner pressure in said condenser upon starting up the fuel-cell system.

2. A fuel-cell system, comprising:
a reformer being heated by a burner, thereby generating reactant gas from fuel;
a fuel cell for generating electric power by the reactant gas;
a condenser for generating condensed water by condensing water content, which is included in the reactant gas to be supplied to the fuel cell or in off gas of the reactant gas;
a reservoir for reserving the condensed water being created in the condenser,
wherein the fuel-cell system further comprises:
(i) a drain valve being disposed between the condenser and the reservoir, and being capable of switching between a closed state, in which communication between the condenser and the reservoir is shut off, and an opened state, in which the condenser is communicated with the reservoir to discharge the water in the condenser to the reservoir; and
(ii) a controller programmed to carry out inner-pressure increment and drain controls in which inner pressure in the condenser is increased and thereafter the drain valve is put into the opened state upon starting up the fuel-cell system;
wherein, in carrying out the inner-pressure increment and drain controls, the controller is further programmed to execute a first manipulation for increasing the inner pressure in the condenser by supplying fuel gas or inactive gas to the condenser; a second manipulation for detecting increment of the inner pressure in the condenser; and a third manipulation for opening the drain valve when increment amount of the inner pressure in the condenser is a first set pressure or more.

3. The fuel-cell system according to claim 1, wherein an opening-closing valve is disposed on an upstream side and downstream side of said condenser, respectively; and an inside of said condenser becomes an enclosed space by shutting off said opening-closing valves when turning off said fuel-cell system.

4. The fuel-cell system according to claim 1, wherein the inside of said condenser for condensing water content being included in the reactant gas being supplied to said fuel cell is connected to said reformer, and water content being included in fuel gas being reformed at said reformer is condensed at the inside of said condenser.

5. The fuel-cell system according to claim 4, wherein said reservoir is connected to said reformer by way of a water-supply passage, and said reservoir supplies water, being reserved in said reservoir, by way of said water-supply passage as raw-material water for reforming reaction in said reformer.

6. The fuel-cell system according to claim 1, wherein, in carrying out said inner-pressure increment and drain controls, said controller is further programmed to execute a first manipulation for increasing the inner pressure in said condenser by supplying fuel gas or inactive gas to said condenser; a second manipulation for detecting increment of the inner pressure in said condenser; and a third manipulation for opening said drain valve when increment amount of the inner pressure in said condenser is a first set pressure or more.

7. The fuel-cell system according to claim 2, wherein a first fluid conveyor source is disposed upstream to said condenser, and said controller is further programmed to judge whether the inner pressure in said condenser is a set pressure or more or not depending on driven time of said first fluid conveyor source.

8. The fuel-cell system according to claim 2, wherein a flow-volume sensor is disposed upstream to said condenser, and said controller is further programmed to judge whether the inner pressure in said condenser is a set pressure or more or not depending on input flow volume being detected by said flow-volume sensor.

9. The fuel-cell system according to claim 1, wherein, when executing said inner-pressure increment controls, said controller is further programmed to carry out abnormal judgment on said system when decrement amount of the inner pressure in said condenser surpasses a second set pressure.

10. The fuel-cell system according to claim 1, wherein said controller is further programmed to judge gas leakage in said condenser by detecting decrement of increased inner pressure in said condenser when executing said inner-pressure increment and drain controls.

11. The fuel-cell system according to claim 1, wherein said reformer includes a reforming-reaction unit, and a burner for heating the reforming-reaction unit; and wherein said controller is further programmed so that it does not carry out said inner-pressure increment and drain controls but ignites the burner of said reformer when the inside of said condenser is judged not to be negative pressure, and further programmed to carry out said inner-pressure increment and drain controls when the inside of said condenser is judged to be negative pressure.

12. The fuel-cell system according to claim 1, wherein said reservoir comprises a water-refining unit for refining water to enhance purity thereof, and reserves water being refined at the water-refining unit.

13. The fuel-cell system according to claim 1, wherein said controller is programmed to execute said inner-pressure increment and drain controls before igniting said burner in said start up of said fuel-cell system.

14. The fuel-cell system according to claim 2, wherein an opening-closing valve is disposed on an upstream side and downstream side of said condenser, respectively; and an inside of said condenser becomes an enclosed space by shutting off said opening-closing valves when turning off said fuel-cell system.

15. The fuel-cell system according to claim 2, wherein the inside of said condenser for condensing water content being included in the reactant gas being supplied to said fuel cell is connected to said reformer, and water content being included in fuel gas being reformed at said reformer is condensed at the inside of said condenser.

16. The fuel-cell system according to claim 15, wherein said reservoir is connected to said reformer by way of a water-supply passage, and said reservoir supplies water, being reserved in said reservoir, by way of said water-supply passage as raw material water for reforming reaction in said reformer.

17. The fuel-cell system according to claim 4, wherein, in carrying out said inner-pressure increment and drain controls, said controller is further programmed to execute a first manipulation for increasing the inner pressure in said condenser by supplying fuel gas or inactive gas to said condenser; a second manipulation for detecting increment of the inner pressure in said condenser; and a third manipulation for opening said drain valve when increment amount of the inner pressure in said condenser is a first set pressure or more.

18. The fuel-cell system according to claim 2, wherein, when executing said inner-pressure increment controls, said controller is further programmed to carry out abnormal judgment on said system when decrement amount of the inner pressure in said condenser surpasses a second set pressure.

19. The fuel-cell system according to claim 2, wherein said controller is further programmed to judge gas leakage in said condenser by detecting decrement of increased inner pressure in said condenser when executing said inner-pressure increment and drain controls.

20. The fuel-cell system according to claim 2, wherein said reformer includes a reforming-reaction unit, and a burner for heating the reforming-reaction unit; and wherein said controller is further programmed so that it does not carry out said inner-pressure increment and drain controls but ignites the burner of said reformer when the inside of said condenser is judged not to be negative pressure, and further programmed to carry out said inner-pressure increment and drain controls when the inside of said condenser is judged to be negative pressure.

21. The fuel-cell system according to claim 2, wherein said reservoir comprises a water-refining unit for refining water to enhance purity thereof, and reserves water being refined at the water-refining unit.

22. The fuel-cell system according to claim 2, wherein said controller is further programmed to execute said inner-pressure increment and drain controls before igniting said burner in said start up of said fuel-cell system.

* * * * *